(12) United States Patent
Singh et al.

(10) Patent No.: US 12,019,883 B2
(45) Date of Patent: Jun. 25, 2024

(54) DATABASE OBJECT STORE SIZE ESTIMATION

(71) Applicant: SAP SE, Walldorf (DE)

(72) Inventors: Ashutosh Kumar Singh, Waterloo (CA); Sammed Kanwade, Pune (IN); Rahulkumar Rank, Ankleshwar (IN); Hemant Kumar Shukla, Jabalpur (IN); Ibrahim Kettaneh, Waterloo (CA); Gunes Aluc, Waterloo (CA)

(73) Assignee: SAP SE, Walldorf (DE)

( * ) Notice: Subject to any disclaimer, the term of this patent is extended or adjusted under 35 U.S.C. 154(b) by 66 days.

(21) Appl. No.: 17/868,450

(22) Filed: Jul. 19, 2022

(65) Prior Publication Data
US 2024/0028224 A1    Jan. 25, 2024

(51) Int. Cl.
*G06F 3/06* (2006.01)
*G06F 16/22* (2019.01)

(52) U.S. Cl.
CPC .......... *G06F 3/0631* (2013.01); *G06F 3/0608* (2013.01); *G06F 3/0673* (2013.01); *G06F 16/2272* (2019.01)

(58) Field of Classification Search
CPC .. G06F 3/0631; G06F 16/2272; G06F 3/0608; G06F 3/0673
See application file for complete search history.

(56) References Cited

U.S. PATENT DOCUMENTS

2019/0171578 A1* 6/2019 Patel ...................... G06F 12/109
2022/0188244 A1* 6/2022 Ambula .............. G06F 12/0246

* cited by examiner

*Primary Examiner* — Gurtej Bansal
(74) *Attorney, Agent, or Firm* — Buckley, Maschoff & Talwalkar LLC

(57) ABSTRACT

A system includes detection of a first allocation of a first memory size in an object store for storage of a first logical page, in response to detection of the first allocation, incrementing a count associated with the first memory size by a first data structure associating a respective count with each of a plurality of memory sizes, detection of a first deallocation of the first logical page, in response to detection of the first deallocation, decrementing a count associated with a second one of the plurality of memory sizes by the first data structure, and determination of a memory usage associated with the object store based on the counts associated with each of the plurality of memory sizes by the first data structure wherein the second one of the plurality of memory sizes is different from the first memory size.

19 Claims, 39 Drawing Sheets

| NBlk(s) | Page UID |
|---|---|
| 2 | 4 |
| 1 | 1 |
| 2 | 5 |
| 2 | 6 |
| 2 | 9 |
| 4 | 10 |
| 4 | 11 |
| 4 | 12 |
| 4 | 7 |
| 4 | 2 |
| 3 | 8 |

1210

1120

| NBlk(s) | zone 1 | zone 2 | zone3 | zone4 |
|---|---|---|---|---|
| 1 | X | | | |
| 2 | | X | X | |
| 3 | | | X | |
| 4 | X | | X | X |

1130

1110

| NBlk(s) | zone 1 | zone 2 | zone3 | zone4 |
|---|---|---|---|---|
| 1 | X | | | |
| 2 | | X | X | |
| 3 | | | X | |
| 4 | X | | X | X |

1130

1510

| PageUID | 4 | 1 | 2 | 9 | 7 |
|---|---|---|---|---|---|
| Deleted | 2 | 1 | 4 | 2 | 2 |
| Actual | 2 | 1 | 4 | 2 | 4 |

| NBlk(s) | Page UID |
|---|---|
| 2 | 1 |
|  |  |
|  |  |
|  |  |
|  |  |
|  |  |
|  |  |
|  |  |
|  |  |
|  |  |
|  |  |
|  |  |

2030

| NBlk(s) | Page UID |
|---|---|
| 2 | 1 |
| 1 | 2 |
| 2 | 3 |
| | |
| | |
| | |
| | |
| | |
| | |
| | |
| | |
| | |
| | |

| NBlk(s) | Page UID |
|---|---|
| 2 | 1 |
| 1 | 2 |
| 2 | 3 |
| 7 | 20 |
| | |
| | |
| | |
| | |
| | |
| | |
| | |
| | |

2030

| NBlk(s) | Page UID |
|---------|----------|
| 2 | 1 |
| 1 | 2 |
| 2 | 3 |
| 7 | 20 |
| 8 | 19 |
| 7 | 18 |
| 5 | 17 |
| | |
| | |
| | |
| | |
| | |
| | |

| NBlk(s) | Page UID |
|---|---|
| 2 | 1 |
| 1 | 2 |
| 2 | 3 |
| 7 | 20 |
| 8 | 19 |
| 7 | 18 |
| 5 | 17 |
| 1 | 4 |
| 2 | 5 |
| 4 | 6 |
| 4 | 7 |
| 6 | 16 |
| 1 | 8 |

DATABASE OBJECT STORE SIZE ESTIMATION

BACKGROUND

A database system typically stores large amounts of data in the form of database tables. Cloud-based object stores are becoming a popular choice of shared storage for database systems which are implemented as database-as-a-service. Cloud-based object stores offer valuable properties such as elastic scale-out, high availability and fault-tolerance, and enable database systems to separate the scalability of compute resources from that of storage resources. Moreover, users benefit from a pay-as-you-go pricing model and a user experience which may be preferable to local or on-premise deployments.

Database systems may create and destroy vast numbers of objects at an extremely rapid rate during execution of a typical database workload. The created and destroyed objects may vary in physical size. Consequently, the total size of all stored objects may fluctuate significantly.

Usage fees for a database-as-a-service may be based at least in part on the total size of the objects stored in the underlying object store. Overestimating the storage size results in overcharging the users, thereby potentially jeopardizing market opportunities. On the other hand, underestimating the storage size may result in low or negative profit margins. Systems are needed to accurately and efficiently estimate the total size of the objects stored in the underlying object store of a database system.

Current systems to estimate the storage size are insufficient. For example, a list operation may be used to traverse all the objects in the object store but would consume hours in the case of a large object store. Alternatively, the database system may implement heavyweight data structures to track the total size as objects are created and destroyed. In another example, it may be assumed that each object has a fixed size (e.g., 16 physical blocks) and only the total number of objects therefore needs to be tracked. This latter scenario may result in severe overestimation of the total storage size.

DETAILED DESCRIPTION

The following description is provided to enable any person in the art to make and use the described embodiments and sets forth the best mode contemplated for carrying out some embodiments. Various modifications, however, will be readily apparent to those in the art.

Some embodiments provide techniques for estimating the total size of objects in an object store at a given time. These techniques operate as objects are created and destroyed and exhibit low storage and computational overhead. Some embodiments offer upper-bound guarantees on the estimated total size such that the actual total size is less than or equal to the estimated total size, while other embodiments offer lower-bound guarantees on the estimated total size such that actual total size is greater than or equal to the estimated total size.

Embodiments encompass several implementations, each of which may favor a slightly different page distribution. One implementation relies on maintenance of a histogram of allocated block sizes. Another implementation combines a histogram with zone maps and may achieve tighter upper bounds through filtering. Other implementations are based on the quantization of object allocations and one of three algorithms (e.g., increment-by-one, prime skip, two pointers) for handling cases in which one of the quantiles is filled.

Embodiments also include protocols for maintaining the data structures (e.g., histograms, zone maps) in a distributed database environment, such as a cloud-based implementation. Such protocols may guarantee crash recoverability and eventual consistency.

Figure 1:
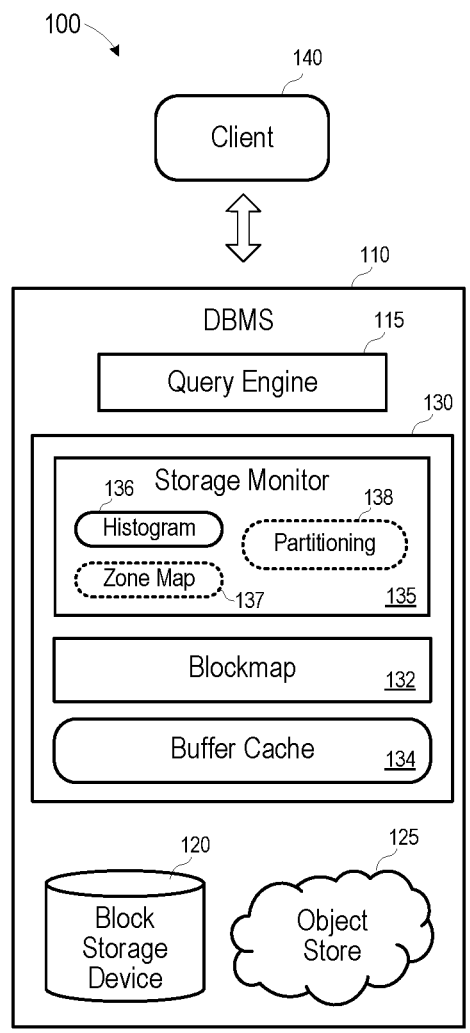
FIG. 1 is a block diagram of a database architecture implementing storage size monitoring according to some embodiments.

FIG. 1 is a block diagram of database architecture 100 implementing storage size monitoring according to some embodiments. Each illustrated element of architecture 100 may be implemented using any suitable combination of computing hardware and/or software that is or becomes known. Architecture 100 may comprise components of a standalone or distributed (i.e., multi-node) database system. In some embodiments, two or more elements of architecture 100 are implemented by a single computing device. One or more elements of architecture 100 may be implemented as a cloud service (e.g., Software-as-a-Service, Platform-as-a-Service).

Architecture 100 includes database management system 110, which may be implemented using one or more computer servers and/or any suitable combination of computing hardware and software. One or more components of system 110 may be located remote from one another and one or more components may be allocated in a cloud-computing environment. Such a cloud computing environment may elastically allocate and de-allocate compute (e.g., virtual machines) and storage (e.g., file-based, block-based, object-based) resources depending on demand, cost and/or other factors.

Database management system 110 may comprise any query-responsive database system that is or becomes known, including but not limited to a structured-query language (i.e., SQL) relational database management system. According to some embodiments, system 110 is a columnar relational database management system designed for online analytical processing (OLAP) workloads and implements multi-version concurrency control (MVCC) with table-level versioning and snapshot isolation. Cloud-based implementations of a database management system according to some embodiments may be distributed, in which each database node is a cloud-based server which can be elastically added and removed from the system.

Generally, system 110 manages data of a database instance which is persisted in block storage device 120 and object store 125. Embodiments may utilize more than one block storage device and/or object store, and some embodiments may utilize only one or more object stores. Block storage device 120 persists system files and database pages which belong to any file-based database spaces managed by system 110. Object store 125, on the other hand, persists database pages which belong to any cloud-based database spaces managed by system 110. For example, object store 125 may include two different object stores provided by two different storage providers. Each object store may be associated with a separate cloud-based database space and may therefore persist database pages of its associated database space.

Embodiments may allow a customer to choose a storage provider based on price and performance characteristics, and to move data between different storage providers as needed. As mentioned above, the cost to a customer for a database-as-a-service offering (e.g., DBMS 110) may depend upon the amount of persisted storage actually used by the customer. The amount of block storage device storage used by a customer may be estimated as is known in the art using a freelist bitmap which indicates currently-used blocks. The amount of object store storage used by a customer may be estimated using the techniques described herein.

System 110 executes queries received from client 140. Such queries may comprise create, read, update and delete operations associated with data of the database instance. Client 140 may comprise a server application which serves many users, and system 110 may in turn serve many such server applications. According to some embodiments, client 140 is a server application and both client 140 and system 110 are executed on a cloud platform which provides services thereto. Users may access client 140 via a Web-based user portal to the cloud platform.

Query engine 115 receives queries associated with logical pages having logical page identifiers. Using a logical page identifier, storage subsystem 130 locates the correct version of a logical page in buffer cache 134 or, if not located in buffer cache 134, in persisted storage 120 or 125. Storage subsystem 130 utilizes blockmap 132 to determine the physical location of a logical page within storage 120 (i.e., according to block number) or within storage 125 (i.e., according to object key). If the query is a read or update query, the requested page is read from persisted storage 120 or 125 and cached in buffer cache 134 (e.g., in Random Access Memory) to optimize retrieval of the page in response to future requests for the page.

When a new logical page of a file-based database space is to be written to block storage device 120, suitable free physical blocks are identified using a freelist (not shown), the new logical page is written to the identified blocks, and blockmap 132 is updated to identify the block number at which the page was written. Upon receiving an instruction to persist an update to this logical page, blockmap 132 is navigated to identify the block number at which the corresponding physical page was written, and the physical page is updated in-place.

When a new logical page of a cloud database space is to be written, a unique object key is generated, and the new logical page is written to object store 125 using the unique object key. An update to an existing logical page of a cloud database space is not persisted as described above with respect to a logical page of a file-based database space, since, unlike a file, portions of an object cannot be re-written. Accordingly, to persist an update to an existing logical page of a cloud database space, another unique object key is generated, and the updated page is written to object store 125 as an object using the unique object key. Since the physical location of the page has changed, blockmap 132 is updated with the new object key.

Storage monitor 135 maintains data structures used to estimate a number of physical storage blocks consumed by a persistent object store of DBMS 110. The data structures may be manipulated based on allocation and deallocation requests received from query engine 115. An allocation request may comprise an instruction to flush a newly-created or updated logical page from buffer cache 134 to persistent storage, while a deallocation request may comprise a request to delete a logical page. An allocation request may specify a logical page number and a number of physical blocks needed to store the logical page in the object store, while a deallocation request may specify a logical page number of a logical page whose physical blocks should be deallocated from the object store.

The data structures of storage monitor 135 include histogram 136. The data structures may also include zone map 137 and, in some implementations, may include zone map 137 and partitioning 138. Histogram 136 may include a respective count associated with each of a number of physical blocks (i.e., NBlks), with the respective counts being incremented and decremented by storage monitor 135 in response to allocations and deallocations as will be described below. A total number of used blocks may be estimated based on histogram 136.

Zone map 137 may associate certain ranges of logical page identifiers with certain NBlks as will be described below. Partitioning 138 may associate logical page identifiers with certain zones as will also be described below. Storage monitor 135 may update zone map 137 and partitioning 138 in response to allocations and deallocations as will be described below.

Figure 2:
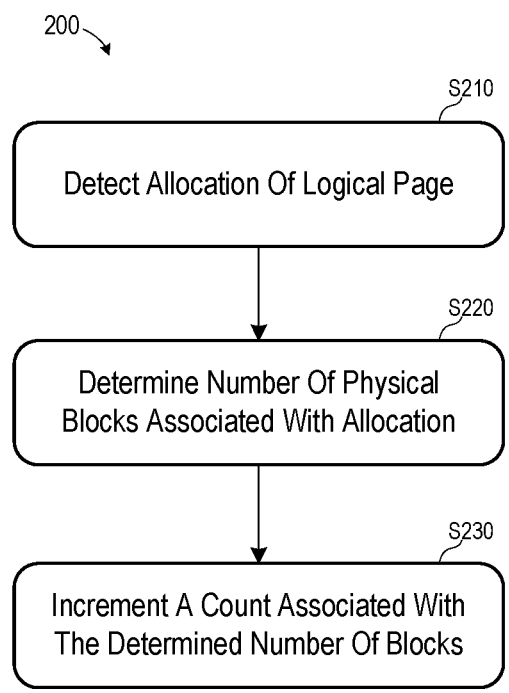
FIG. 2 comprises a flow diagram to manage a data structure in response to logical page allocation according to some embodiments.

FIG. 2 comprises a flow diagram to manage a data structure in response to a allocation of a logical page within an object store according to some embodiments. In some embodiments, various hardware elements of system 110 execute program code to perform process 200. Process 200 and all other processes mentioned herein may be embodied in processor-executable program code read from one or more non-transitory computer-readable media, such as a hard disk drive, a volatile or non-volatile random access memory, a DVD-ROM, a Flash drive, and a magnetic tape, and may be executed by one or more processing units, including but not limited to hardware processors, processor cores, and processor threads. In some embodiments, hard-wired circuitry may be used in place of, or in combination with, program code for implementation of processes according to some embodiments. Embodiments are therefore not limited to any specific combination of hardware and software.

At S210, allocation of a logical page is detected. Detection of an allocation may comprise detection of a request to allocate a logical page within an object store, or detection of a completed allocation (i.e., storage) within an object store. The allocation may be detected at S210 by storage monitor 135 based on communication with other components of storage subsystem 130 such as blockmap 132.

In some embodiments, a logical page corresponds to 16 physical data blocks. The logical page is compressed prior to persistence, therefore the number of physical data blocks allocated for persistence of a logical page may be anywhere from 1 to 16. Embodiments are not limited to 16 uncompressed physical data blocks per logical page.

The number of physical blocks associated with the allocation is determined at S220. In this regard, an allocation request may specify a number of physical blocks (i.e., NBlks) to be allocated for persisting the logical page in the object store. A count associated with the determined number of blocks is incremented at S230.

The count may be an element of a histogram which maintains a count for each possible NBlk size. The counts may be initialized (e.g., to 0) prior to storage of customer data in the object store. Process 200 therefore increments a count for each detected allocation.

Figure 3:
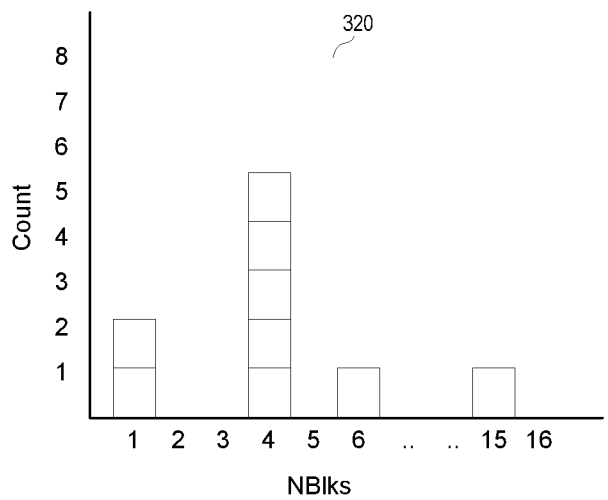
FIG. 3 illustrates management of a data structure in response to logical page allocation according to some embodiments.

FIG. 3 illustrates management of a data structure in response to logical page allocations according to some embodiments. Table 310 represents nine page allocations in the order (top to bottom) in which they are detected, each of which is associated with an NBlk size. The page to be allocated is assigned a logical page identifier, hereinafter referred to as a PageUID and used to identify the logical page. Table 310 is not stored in volatile memory or persistence but is presented to illustrate operation of process 200 according to some embodiments.

Histogram 320 is a data structure consisting of a count for each of sixteen different NBlk sizes. Histogram 320 may be stored as histogram 136 of storage monitor 135. Assuming that each count was set to 0 prior to the allocation of PageUID 1 shown in table 310, the allocation causes the count associated with NBlk=4 to be incremented from 0 to 1. In response to the allocation of PageUID 2, the count associated with NBlk=15 is also incremented from 0 to 1. Process 200 continues to execute in this manner for the remaining seven allocations of table 310 to increment the counts associated with each NBlk size of histogram 320 to those shown in FIG. 3.

Figure 4:
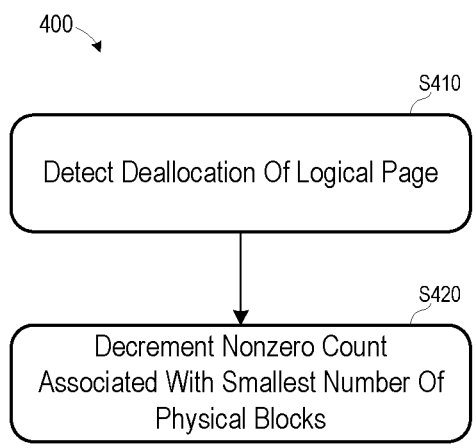
FIG. 4 comprises a flow diagram to manage a data structure in response to logical page deallocation according to some embodiments.

FIG. 4 comprises a flow diagram to manage a data structure created by process 200 in response to logical page deallocation according to some embodiments. At S410, deallocation of a logical page is detected. Detection of an allocation may comprise detection of a request to deallocate a logical page having a particular PageUID within an object store, or detection of a completed deallocation (i.e., deletion) of such a page within an object store. The deallocation may be detected by storage monitor 135 of storage subsystem 130.

A count of the histogram is decremented at S420 in response to the detected deallocation. The decremented count is the count associated with the smallest number of NBlks which is not equal to 0. Notably, the decremented count is not determined based on the number of physical blocks which were originally allocated for the logical page being deallocated, and therefore it is not necessary to maintain a data structure which indicates the number of physical blocks allocated for each PageUID.

Figure 5:
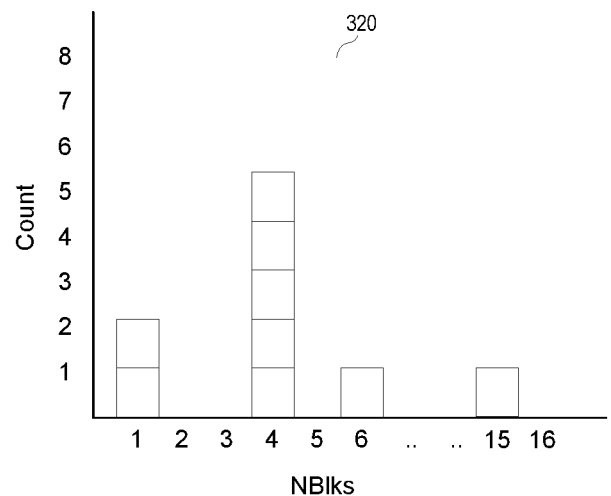
FIG. 5 illustrates management of a data structure in response to logical page deallocation according to some embodiments.
Figure 5:
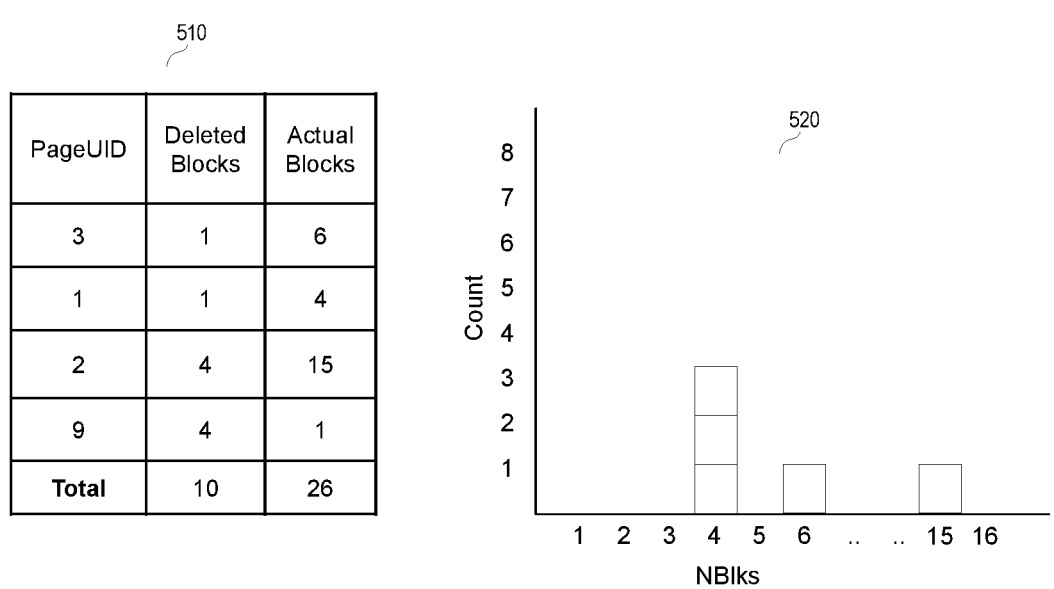

FIG. 5 includes data structures for illustrating decrementing of counts according to some embodiments of process 400. Histogram 320 reflects the allocations of table 310 as described above. It is now assumed that the four deallocations indicated in table 510 are detected. The deallocations are associated with PageUIDs 3, 1, 2 and 9.

Upon detection of the deallocation of PageUID 3, it is determined that NBlk=1 is the smallest NBlk size associated with a non-zero count. Accordingly, the count is decremented from 2 to 1 at S420. Next, the deallocation of PageUID 1 is detected and it is again determined that NBlk=1 is the smallest NBlk size associated with a non-zero count. The corresponding count is therefore decremented from 1 to 0.

A deallocation of PageUID 2 is then detected. At this point, since the count associated with NBlk=1 is 0, it is determined that the smallest NBlk size associated with a non-zero count is NBlk=4. Accordingly, this count is decremented from 5 to 4. The deallocation of PageUID 9 is then detected and it is determined that NBlk=4 is the smallest NBlk size associated with a non-zero count. The corresponding count is therefore decremented from 4 to 3, leaving the counts as shown in histogram 520.

The number of physical blocks used by the object store at any given time may be estimated by multiplying each current count by its corresponding NBlk size and summing the products. With respect to histogram 520, the number of blocks may be estimated as (3*4)+(1*6)+(1*15)=33. Table 510 shows, based on the allocations of table 310, that deallocation of PageUIDs 3, 1, 2 and 9 deallocates 26 actual physical blocks but the resulting histogram modifications per process 400 reflect deallocation of 10 physical blocks. Accordingly, the estimated number of physical blocks used by the object store is greater than (i.e., an upper bound of) the actual number of used physical blocks.

Figure 6:
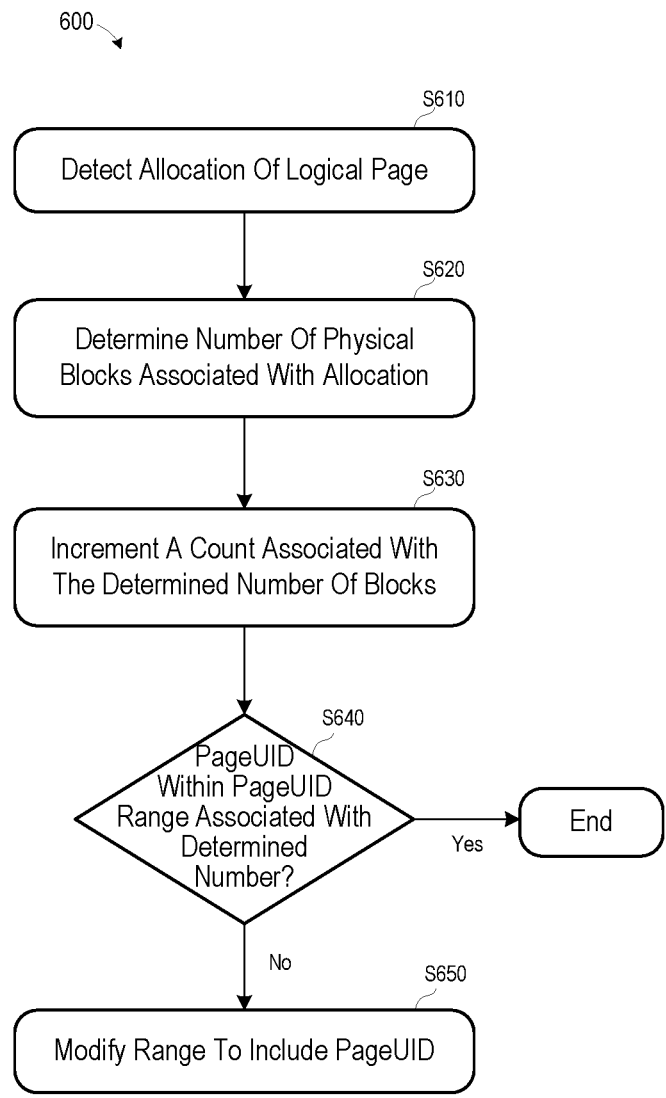
FIG. 6 comprises a flow diagram to manage data structures in response to logical page allocation according to some embodiments.

FIG. 6 is a flow diagram of process 600 to manage storage-tracking data structures based on page allocations according to some embodiments. Process 600, when implemented in conjunction with process 800 of FIG. 8, may provide a tighter (i.e., closer to actual) upper bound estimate than provided by processes 200 and 400.

Allocation of a logical page is detected at S610. The allocation is associated with a number of physical blocks which is determined at S620. As described with respect to S230, a count associated with the determined number of blocks is incremented at S630. Accordingly, S610 through S630 may be implemented as described with respect to S210 through S230.

At S640, it is determined whether a PageUID assigned to the allocated logical page is within a PageUID range associated with the determined number of physical blocks. If so, process 600 terminates. If not, the range is modified at S650 to include the PageUID.

Figure 7:
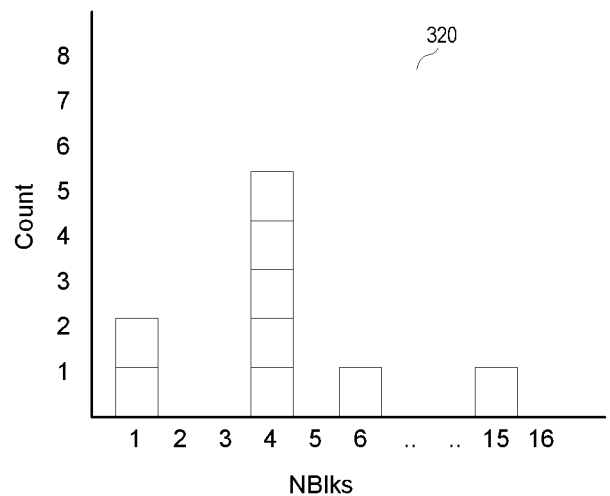
FIG. 7 illustrates management of data structures in response to logical page allocation according to some embodiments.

FIG. 7 includes table 310 representing a sequence of logical page allocations, which is not stored as described above. Table 710 will be referred to as a zone map and may be stored as zone map 137 of storage monitor 135. Zone map 710 associates each NBlk size with a min UID and a max UID. Initially, the min UID and max UID values are unpopulated and each count of histogram 320 is set to 0.

Upon detection of the allocation of a first logical page (PageUID 1 of table 710), the count associated with NBlk=4 is incremented from 0 to 1 at S630. Next, at S640, it is determined whether PageUID 1 is within a PageUID range associated with NBlk=4. Since zone map 710 does not associate any PageUID range (no min UID or max UID) with NBlk=4, the determination at S640 is negative. Therefore, at S650, a range associated with NBlk=4 is modified to include Page UID 1. For example, the min UID associated with NBlk=4 is set to 1 and the max UID associated with NBlk=4 is also set to 1.

Next, upon detection of the allocation of a next logical page (i.e., PageUID 2), the count of histogram 320 associated with NBlk=15 is incremented from 0 to 1 at S630. It is then determined at S640 whether PageUID 2 is within a PageUID range associated with NBlk=15. Since zone map 710 does not associate any PageUID range with NBlk=the min UID associated with NBlk=15 is set to 2 and the max UID associated with NBlk=15 is also set to 2.

The allocations of the logical pages associated with PageUIDs 3 and 4 are handled similarly, with the corresponding counts of histogram 320 being incremented, and with the min UID and max UID associated with NBlk=6 being set to 3 and the min UID and max UID associated with NBlk=1 being set to 4.

The count of histogram 320 associated with NBlk=4 is incremented from 1 to 2 upon detection of the allocation of a logical page associated with PageUID 5. It is then determined at S640 that PageUID 5 is not within a PageUID range associated with NBlk=4, since the min UID associated with NBlk=4 and the max UID associated with NBlk=4 are both set to 1. Accordingly, at S650, the max UID associated with NBlk=4 is set to 5 so that Page UID 5 is within the PageUID range associated with NBlk=4.

Similarly, upon detection of the allocation of a logical page associated with PageUID 6, the count of histogram 320 associated with NBlk=4 is incremented from 2 to 3 and the max UID associated with NBlk=4 is set to 6 so that Page UID 6 is within the PageUID range associated with NBlk=4. The next-allocated page (Page UID 7) is also associated with NBlk=4, so the max UID associated with NBlk=4 is set to 7, and the count of histogram 320 associated with NBlk=4 is again incremented, from 3 to 4. Since Page UID 8 is also associated with NBlk=4, the max UID associated with NBlk=4 is then set to 8 and the count of histogram 320 associated with NBlk=4 is incremented from 4 to 5.

Finally, the allocation of a logical page associated with PageUID 9 is detected, having NBlk=1. The count of histogram 320 associated with NBlk=1 is incremented from 1 to 2. It is then determined at S640 that PageUID 9 is not within a PageUID range associated with NBlk=1, since the min UID associated with NBlk=1 and the max UID associated with NBlk=1 are both set to 5. Therefore, at S650, the max UID associated with NBlk=1 is set to 9 so that Page UID 9 is within the PageUID range associated with NBlk=1.

Figure 8:
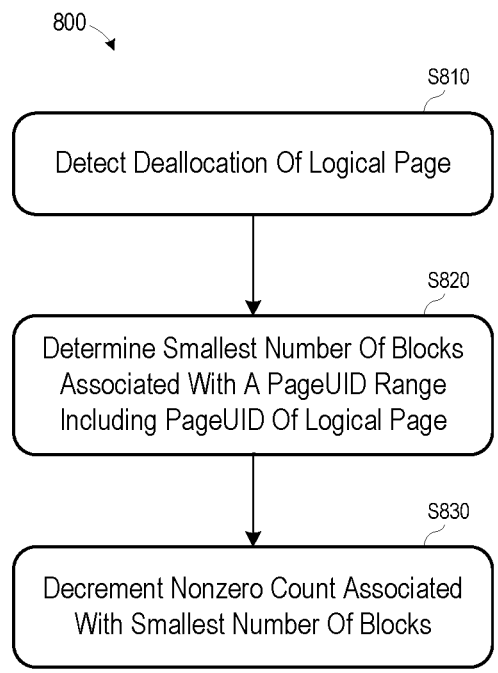
FIG. 8 comprises a flow diagram to manage data structures in response to logical page deallocation according to some embodiments.

FIG. 8 comprises a flow diagram to manage data structures created by process 600 in response to logical page deallocation according to some embodiments. Deallocation of a logical page having a particular Page UID is detected at S810 as described above. At S820, a smallest NBlk size associated with a PageUID range which includes the PageUID of the deallocated logical page is determined. A count associated with the determined number of blocks is decremented at S830. If the count is 0, a next-smallest NBlk size associated with a qualifying PageUID range is determined and its associated count is decremented. Advantageously, the count to be decremented at S830 is determined without need for a data structure which indicates the number of physical blocks allocated for each PageUID.

Figure 9:
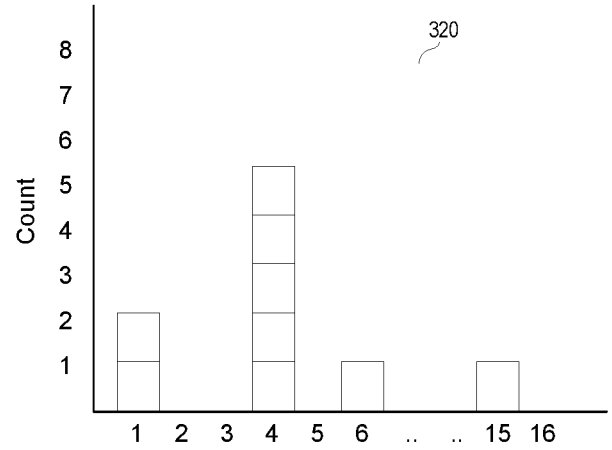
FIG. 9 illustrates management of data structures in response to logical page deallocation according to some embodiments.
Figure 9:
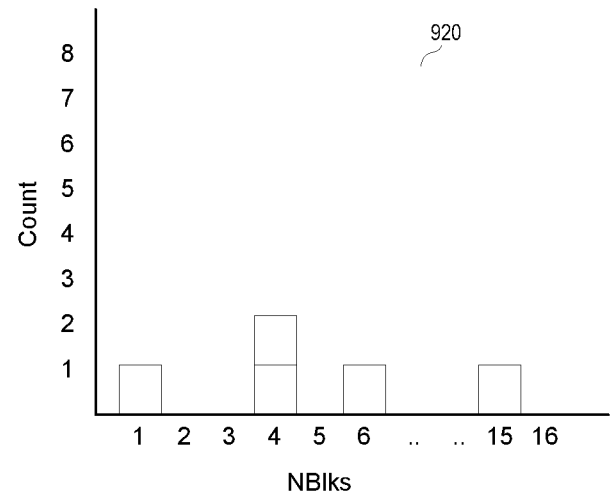

FIG. 9 includes data structures for illustrating operation according to some embodiments of process 800. Histogram 320 reflects the allocations of table 310 as described above. Table 910 indicates detected page deallocations, responses to each of which will be described below.

In response to a detection of the deallocation of PageUID 3, it is determined that the smallest NBlk size associated with a PageUID range including PageUID 3 is determined. According to zone map 710, NBlk sizes 4 and 6 are both associated with a PageUID range which includes PageUID 3. Since 4 is less than 6, NBlk=4 is determined at S820. Accordingly, at S830, the count associated with NBlk=4 is decremented from 5 to 4.

Next, the deallocation of PageUID 1 is detected and it is determined based on zone map 710 that only NBlk=4 is associated with a range including Page UID 1. The count associated with NBlk=4 is therefore decremented from 4 to 3 at S830.

The deallocation of PageUID 2 is then detected. Based on zone map 710, it is determined that NBlk sizes 4 and 15 are associated with a PageUID range which includes PageUID 2. The count associated with the smaller NBlk size (i.e., 4) is decremented from 3 to 2 at S830.

Upon detection of the deallocation of PageUID 9, it is determined that NBlk=1 is the only NBlk size associated with a PageUID range which includes PageUID 9. The count corresponding to NBlk=1 is decremented from 2 to 1 at S830, resulting in the counts shown in histogram 920.

Based on histogram 520, the number of physical blocks in use by the object store may be estimated as (1*1)+(2*4)+(1*6)+(1*15)=30. Table 910 shows, with reference to the allocations of table 310, that deallocation of PageUIDs 3, 1, 2 and 9 deallocates 26 actual physical blocks (leaving 17 physical blocks in use) but the resulting histogram modifications per process 800 estimate the deallocation of 13 physical blocks (leaving 30 estimated physical blocks in use). Consequently, in case of the particular allocations and deallocations of the above examples, the estimated number of physical blocks used by the object store according to processes 600 and 800 is greater than the actual number of used physical blocks, but less than the number (i.e., 33) estimated according to processes 200 and 400.

Figure 10:
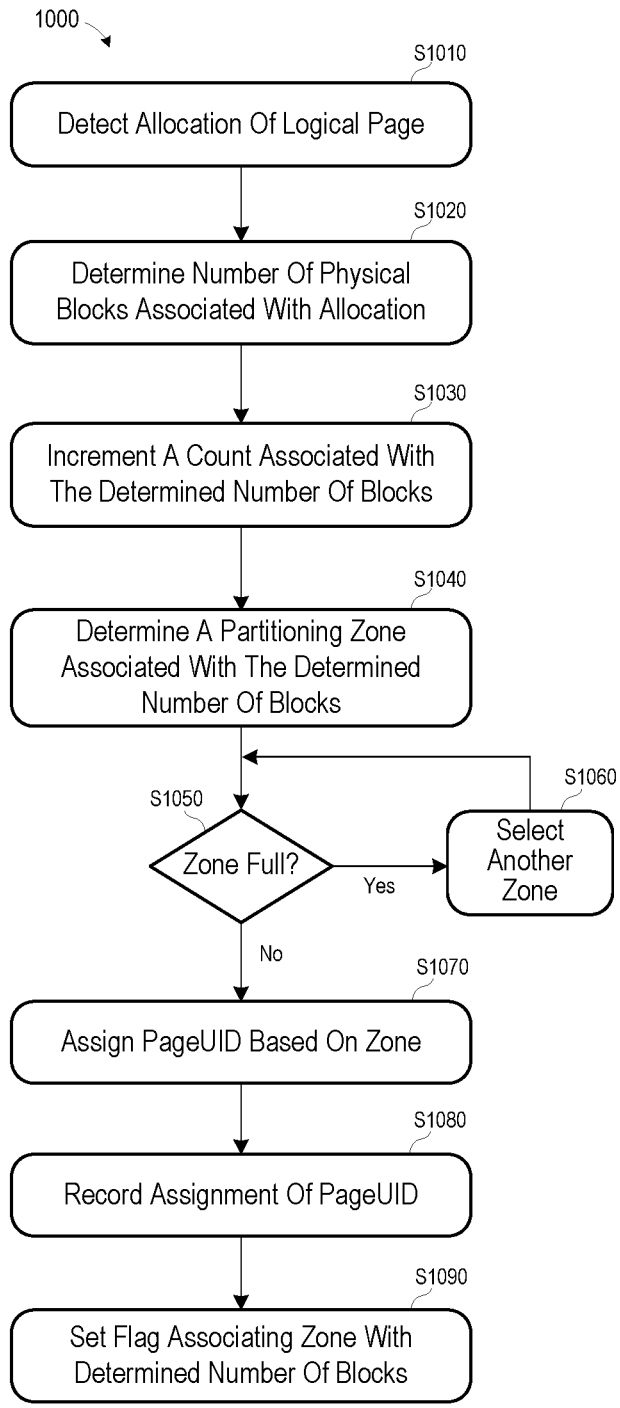
FIG. 10 comprises a flow diagram to manage data structures in response to logical page allocation according to some embodiments.

FIG. 10 is a flow diagram of process 1000 to manage storage-tracking data structures based on page allocations according to some embodiments. Process 1000 may be implemented in conjunction with process 1400 of FIG. 14 to provide, in some scenarios, a tighter upper bound estimate than that provided by the above-described processes.

Allocation of a logical page is detected at S1010 and the number of physical blocks associated with the allocation is determined at S1020. A count associated with the determined number of blocks is incremented at S1030. The count may be implemented via a histogram as described above.

At S1040, a partitioning zone associated with the determined number of blocks is determined. In this regard, process 1000 may utilize a partitioning data structure which partitions a PageUID range into zones, with each zone associated with a particular NBlk size. For example, in view of a maximum size of 16 physical blocks per logical page, a partitioning data structure may partition a range of 10,000 consecutive PageUIDs into 16 zones, each of which is associated with a respective NBlk size and with 625 PageUIDs.

After determining the zone with which the number of blocks of the logical page is associated, it is determined at S1050 whether the zone is full. If the zone is full, another zone is selected at S1060 and flow cycles between S1050 and S1060 until a non-full zone is selected. Filling of a zone and selection of another zone will be described in detail with respect to an example below.

At S1070, the logical page is assigned a PageUID based on the zone which was selected for the logical page. An association between the zone and the PageUID is recorded (e.g., by incrementing a count associated with the zone) at S1080. Finally, at S1090, a flag associating the zone with the number of blocks of the logical page is set, if not already set. The flag may be set within a zone map data structure, as also described below.

Figure 11:
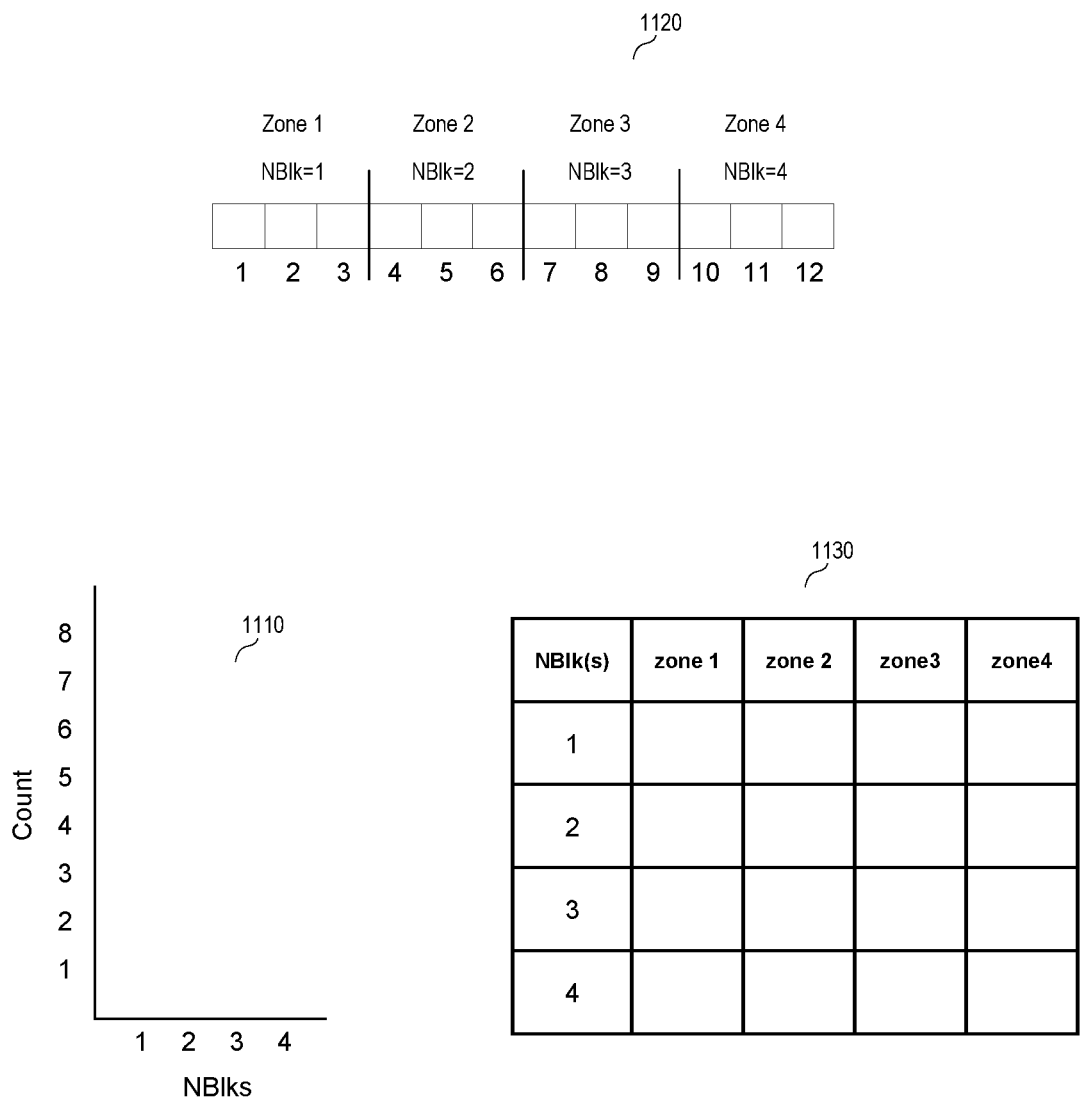
FIGS. 11-13 illustrates management of data structures in response to logical page allocation according to some embodiments.

FIG. 11 includes data structures which will be used in the foregoing example. Histogram 1110 maintains a count for each of four NBlk sizes. Partitioning data structure 1120 associates PageUIDs with various NBlk sizes. In the present example, a logical page may consist of 1 to 4 physical blocks, corresponding to NBlk sizes 1 to 4. Zone 1 of partitioning data structure 1130 associates PageUIDs 1, 2 and 3 with NBlk=1, Zone 2 of partitioning data structure 1130 associates PageUIDs 4, 5 and 6 with NBlk=2, Zone 3 of partitioning data structure 1130 associates PageUIDs 7, 8 and 9 with NBlk=3, and Zone 4 of partitioning data structure 1130 associates PageUIDs 10, 11 and 12 with NBlk=4.

Table 1130 is a zone map which may be used to associate each NBlk size with 0, 1 or more zones of partitioning data structure 1130. An association between an NBlk size and a zone indicates that at least one PageUID of the zone corresponds to a page which is of the NBlk size. Data structures 1120, 1130 and 1140 are unpopulated prior to any page allocations.

Table 1210 represents a sequence of detected page allocations according to an example. Specifically, it is assumed that allocation of a two NBlk page is first detected at S1010. The count of histogram 1110 associated with NBlk=2 is therefore incremented from 0 to 1 at S1030. Next, at S1040, it is determined that NBlk=2 is associated with zone 2 of partitioning data structure 1120.

At S1050, a zone is considered full if all PageUIDs of the zone have been assigned to logical pages. In some embodiments, a PageUID counter is assigned to each zone, initialized to the lowest PageUID value associated with the zone. For example, the counter assigned to zone 1 is initialized to 1, the counter assigned to zone 2 is initialized to 4, etc. In other examples, a flag may be maintained for each PageUID of a zone, where the flag of a particular PageUID is set once the particular PageUID is assigned to a logical page. This latter implementation is reflected in partitioning data structure 1120 to facilitate understanding of process 1000 according to some embodiments.

Zone 2 is determined to be not full at S1050 because at least one PageUID of zone 2 is not yet assigned to a logical page. The logical page is assigned PageUID 4 of zone 2 at S1070 and the assignment is recorded at S1080 by setting a flag of partitioning data structure 1120 associated with PageUID 4. Setting of the flag is represented by the cross-hatched box adjacent to numeral 4 in zone 2 of partitioning data structure 1120 of FIG. 12. In other embodiments, the assignment is recorded at S1080 by incrementing a PageUID counter associated with zone 2 from 4 to 5.

At S1090, a flag is set to associate zone 2 with the size of the allocated page, i.e., NBlk=2. As shown in zone map 1130 of FIG. 12, a flag is set in column "zone 2" at row "2" to associate zone 2 with NBlk=2.

Next, upon detection of the allocation of the second logical page of table 1210 associated with NBlk=1, a count of histogram 1110 associated with NBlk=1 is incremented from 0 to 1 at S1030. It is then determined at S1040 that NBlk=1 is associated with zone 1 of partitioning data structure 1120.

Figure 12:
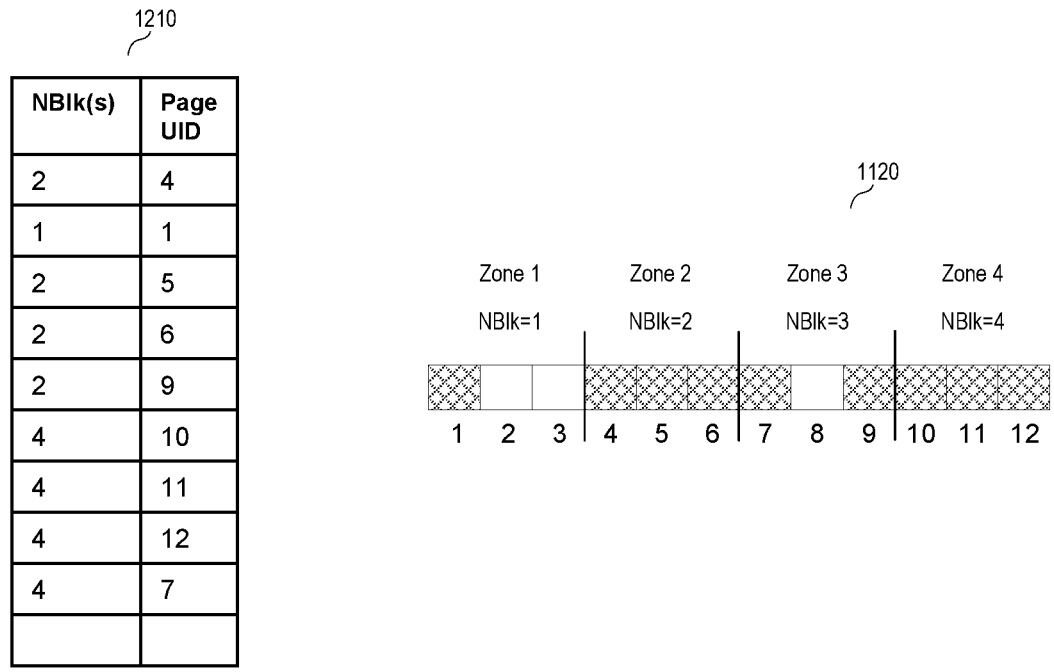
Figure 12:
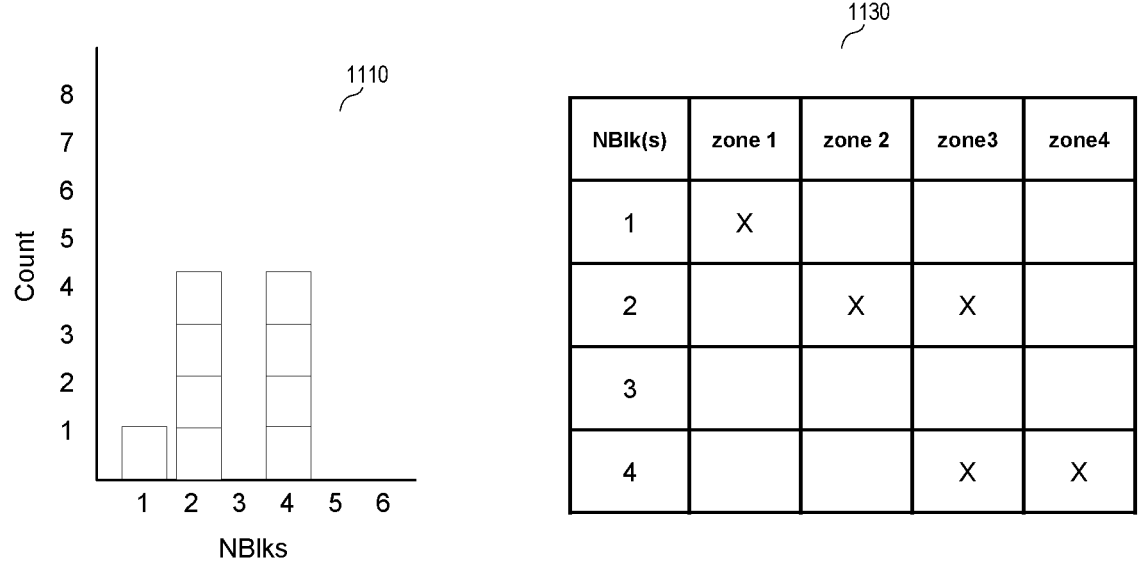

Zone 1 is determined to be not full at S1050 because no PageUIDs of zone 1 have been assigned to a logical page. The logical page is assigned PageUID 1 of zone 1 at S1070 and the assignment of the PageUID is recorded at S1080 by setting a flag of partitioning data structure 1120 associated with PageUID 1 as shown in FIG. 12. In the other embodiments described above, the assignment is recorded at S1080 by incrementing a PageUID counter associated with zone 1 from 1 to 2. Moreover, a flag of zone map 1130 is set to associate zone 1 with NBlk=1 at S1090, as also shown in of FIG. 12.

Allocation of the third logical page of table 1210 is then detected at S1010. The size of the third logical page is NBlk=2. Accordingly, a count of histogram 1110 associated with NBlk=2 is incremented from 1 to 2 at S1030. It is then determined that NBlk=2 is associated with zone 2 of partitioning data structure 1120.

Zone 2 is determined to be not full at S1050 because only PageUID 4 of zone 2 has thus far been assigned to a logical page. The third logical page is assigned PageUID of zone 2 at S1070 and the assignment of the PageUID is recorded at S1080 by setting a flag of partitioning data structure 1120 associated with PageUID 5 as shown in FIG. 12. At S1090, no action is required because zone map 1130 already includes a flag associating zone 2 with NBlk=2.

Process 1000 continues execution as described above in response to detection of the allocation of the fourth logical page of table 1210. Specifically, a count associated with NBlk=2 is incremented from 2 to 3, PageUID 6 of zone 2 is assigned to the fourth logical page, and no action is taken at S1090 because zone map 1130 already includes a flag associating zone 2 with NBlk=2.

Next, the allocation of the fifth logical page of table 1210 is detected. Since the fifth logical page is associated with NBlk=2, a count of histogram 1110 associated with NBlk=2 is incremented from 3 to 4 at S1030. Zone 2 is identified at S1040 as being associated with NBlk=2. However, at S1050, it is determined that zone 2 is full because all of its associated PageUIDs (i.e., 4, 5, 6) have been previously assigned to logical pages.

Flow therefore proceeds to S1060 to select another zone. Selection of another zone at S1060 may proceed in many suitable manners. In one example, each zone is associated with a prime number which is used during selection of another zone at S1060. Each zone may be associated with a different prime number.

For example, current zone 2 may be associated with prime number 3, indicating that three PageUIDs should be skipped from zone 2 to select a next zone. Such skipping may skip from PageUID 6 to 7, from PageUID 7 to 8, and from PageUID 8 to 9. It is then determined at S1050 that zone 3 of PageUID 9 is not full and PageUID 9 is assigned to the fifth logical page. The flag of partitioning data structure 1120 associated with PageUID 9 is set at S1080 as shown in FIG. 12. At S1090, zone map 1130 is updated to include a flag associating zone 3 (which includes PageUID 9) with NBlk=2 (the size of the fifth logical page assigned PageUID 9).

If it was determined at S1050 that zone 3 was full, a zone would be selected at S1060 by skipping three PageUIDs and the process would repeat until the selected zone was determined to be not full at S1050. The use of prime numbers is intended to ensure that a non-full zone is eventually selected, if one exists. In some embodiments, a single PageUID is skipped until a non-full zone is found.

In some embodiments, the skipping at S1060 is between zones rather than between PageUIDs. For example, skipping from zone 2 at S1060 in the current example includes skipping from zone 2 to zone 3, from zone 3 to zone 4, and from zone 4 to zone 1. In the present example, zone 1 is not full but PageUID 1 has been previously assigned so PageUID 2 would be assigned to the fifth logical page.

The sixth, seventh and eighth logical pages of table 1210 are each of size NBlk=4. Accordingly, process 1000 executes with respect to these pages as described above with respect to the first, third and fourth logical pages to increment the count of histogram 1110 associated with NBlk=4 from 0 to 3, to assign PageUIDs 10, 11 and 12 to the sixth, seventh and eighth logical pages, and to set a flag of zone map 1130 associating NBlk=4 with zone 4 (i.e., the zone of PageUIDs 10, 11 and 12).

In response to the allocation of the ninth logical page of table 1210, a count of histogram 1110 associated with NBlk=4 is incremented from 3 to 4 at S1030 and zone 4 is identified at S1040 as being associated with NBlk=4. At S1050, it is determined that zone 4 is full because all of its associated PageUIDs (i.e., 10, 11 and 12) have been previously assigned to logical pages.

Flow therefore proceeds to S1060. In the present example, zone 4 is associated with prime number 7, therefore S1060 may consist of skipping seven PageUIDs of partitioning data structure 1120 from PageUID 12 to PageUID 7 of zone 3. It is then determined at S1050 that zone 3 not full and PageUID 7 is assigned to the ninth logical page at S1070. The flag of partitioning data structure 1120 associated with PageUID 7 is set at S1080 as shown in FIG. 12 and zone map 1130 is updated at S1090 to include a flag associating zone 3 (which includes PageUID 7) with NBlk=4 (the size of the ninth logical page assigned PageUID 7).

Figure 13:
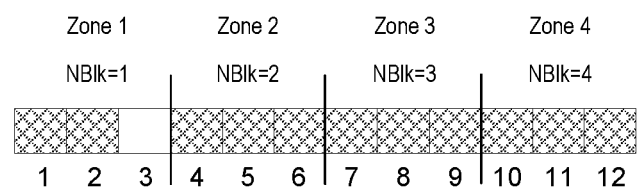
Figure 13:
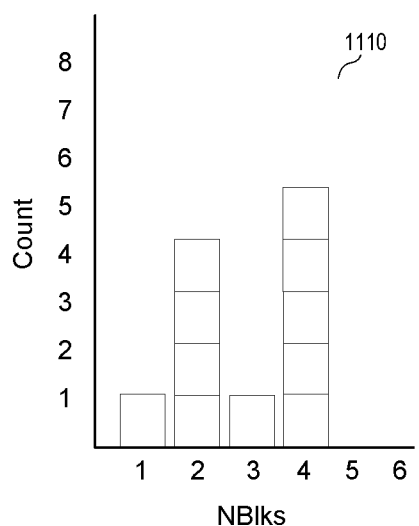

FIG. 13 represents allocation of two additional logical pages, one of size NBlk=4 and another of size NBlk=3. In response to the first allocation, a count of histogram 1110 associated with NBlk=4 is incremented from 4 to 5. Zone 4 is identified at S1040 as being associated with NBlk=4 but is determined as full at S1050. Since zone 4 is associated with prime number 7, S1060 includes skipping 7 PageUIDs from PageUID 12 of zone 4 to reach PageUID 7 of zone 3. However, since zone 3 is full, S1060 is executed again to skip 7 PageUIDs from PageUID 7 of zone 3 to reach PageUID 2 of zone 1. PageUID 2 is assigned to the logical page at S1070, the flag of partitioning data structure 1120 associated with PageUID 2 is set at S1080. Also, at S1090, zone map 1130 is updated to include a flag associating zone 1 (which includes PageUID 2) with NBlk=4 (the size of the logical page assigned PageUID 2).

Upon detecting the allocation of the logical page of size NBlk=3, a count of histogram 1110 associated with NBlk=3 is incremented from 0 to 1. Zone 3 is identified at S1040 as being associated with NBlk=3 and is determined as not full at S1050 because PageUID 8 of zone 3 has not been assigned to a logical page. PageUID 8 is assigned to the logical page at S1070, the flag of partitioning data structure 1120 associated with PageUID 8 is set at S1080, and zone map 1130 is updated to include a flag associating zone 3 with NBlk=3.

Figure 14:
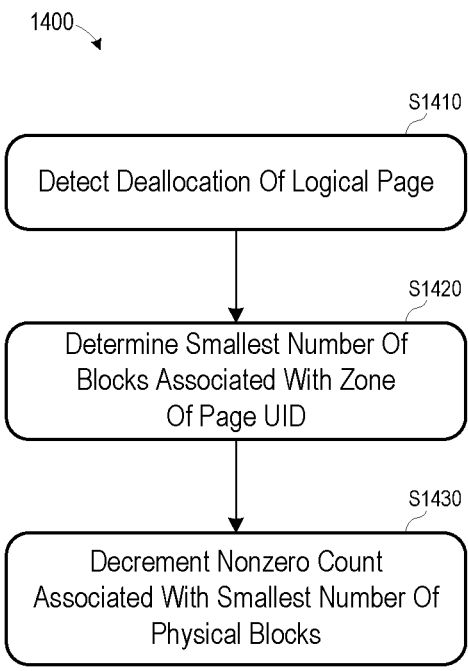
FIG. 14 comprises a flow diagram to manage data structures in response to logical page deallocation according to some embodiments.
Figure 15:
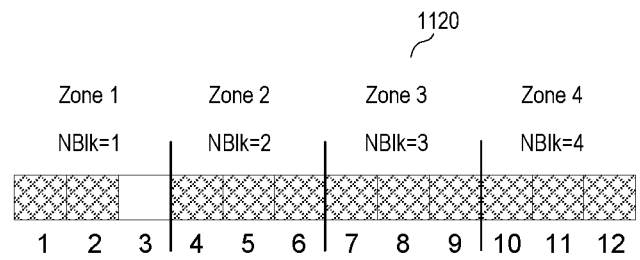
FIG. 15-18 illustrates management of data structures in response to logical page deallocation according to some embodiments.
Figure 15:
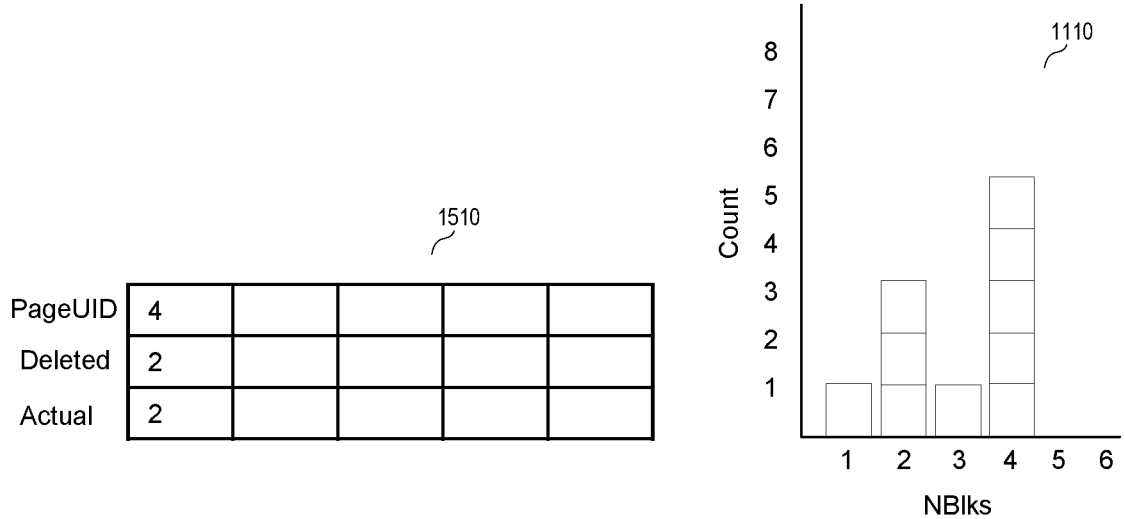

FIG. 14 comprises a flow diagram to manage data structures created by process 1000 in response to logical page deallocation according to some embodiments. Deallocation of a logical page having a particular PageUID is detected at S1410 as described above. At S1420, a smallest NBlk size associated with the zone of the PageUID is determined. A count associated with the determined NBlk size is decremented at S1430. If the count associated with the determined NBlk size is 0, a next-smallest NBlk size associated with the zone of the PageUID determined and its associated count is decremented. The count to be decremented at S1430 is determined based only on a histogram, zone map and partitioning data structure, and without need for a large and difficult-to-maintain data structure which associates each assigned PageUID with a number of allocated physical blocks.

FIGS. 15-18 illustrate operation according to some embodiments of process 1400 based on data structures populated according to process 1000. Partitioning data structure 1120 and zone map 1130 reflect the allocations of table 1210 as described above.

Table 1510 indicates page deallocations which are detected at S1410 according to the present example. As shown, deallocation of PageUID 4 is first detected. A smallest NBlk size associated with the zone of the PageUID is determined at S1420. The zone of PageUID 4 is determined based on partitioning data structure 1120, which indicates that PageUID 4 belongs to zone 2.

Zone map 1130 is consulted to determine a smallest NBlk size associated with zone 2. In the present example, the smallest (and only) NBlk size associated with zone 2 is NBlk=2. Accordingly, the count of histogram 1110 associated with NBlk=2 is decremented from 4 to 3 as reflected in FIG. 15.

Figure 16:
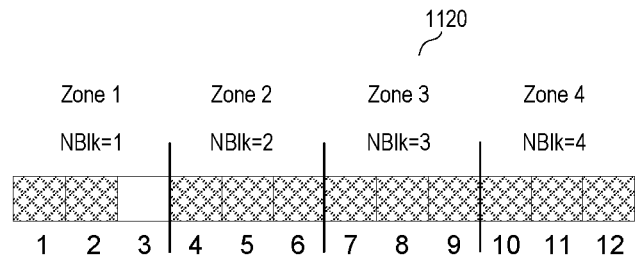
Figure 16:
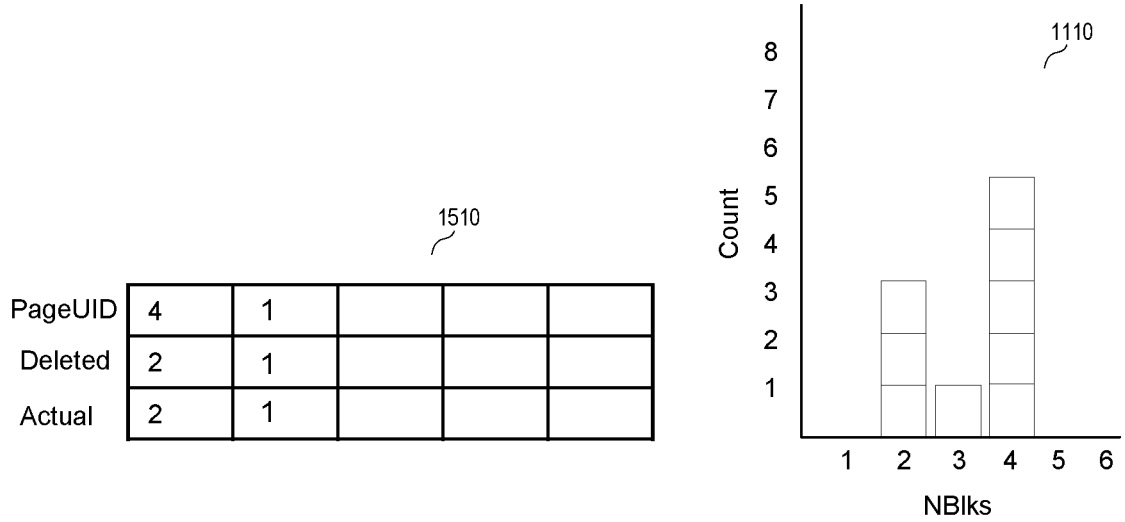

Table 1510 of FIG. 16 reflects a subsequent deallocation of PageUID 1. To determine a smallest NBlk size associated with the zone of PageUID 1, it is first determined based on partitioning data structure 1120 that PageUID 1 is associated with zone 1. Zone map 1130 indicates that zone 1 is associated with NBlk=1 and NBlk=4, therefore the smallest NBlk size associated with zone 1 is NBlk=1. The count of histogram 1110 associated with NBlk=1 is therefore decremented from 1 to 0 as reflected in FIG. 16.

Figure 17:
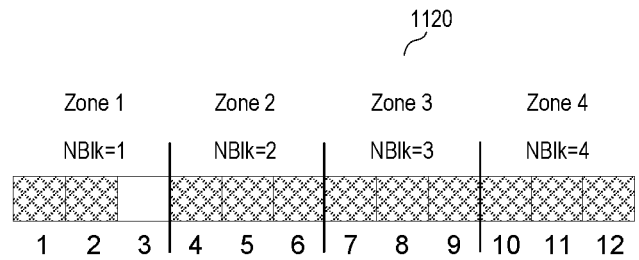
Figure 17:
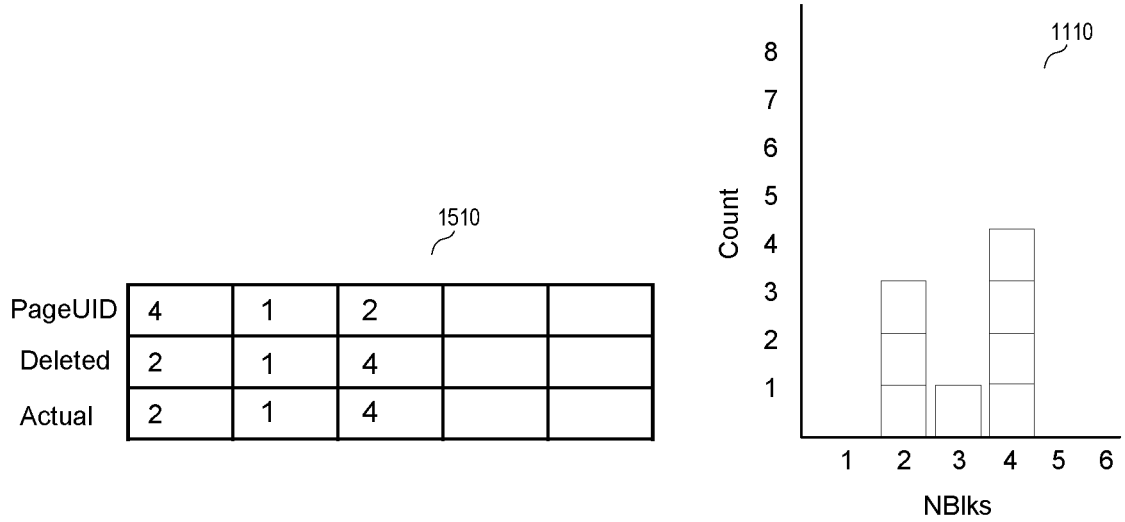

As shown in FIG. 17, PageUID 2 is then deallocated. It is determined based on partitioning data structure 1120 that PageUID 2 is associated with zone 1, and the smallest NBlk size associated with zone 1 is NBlk=1. However, the count of histogram 1110 associated with NBlk=1 is 0 so the next-smallest NBlk size associated with zone 1 is determined as NBlk=4. Since the count of histogram 1110 associated with NBlk=4 is greater than 0, this count is decremented from 5 to 4.

Figure 18:
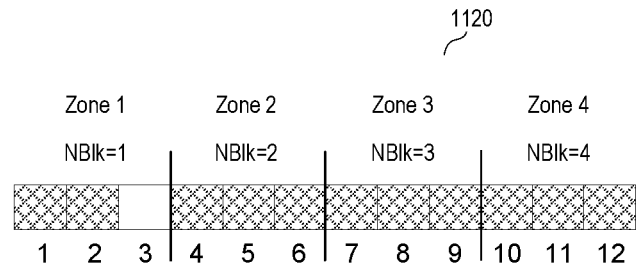
Figure 18:
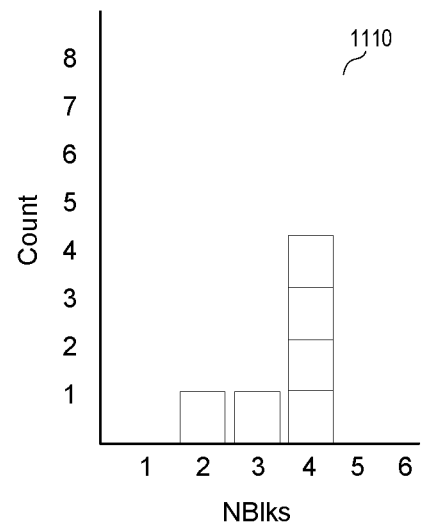

Table 1510 of FIG. 18 reflects deallocations of PageUIDs 9 and 7. Regarding the deallocation of PageUID 9, it is determined that PageUID 9 is associated with zone 3 of partitioning data structure 1120. Zone map 1130 associates zone 3 with NBlk=2, NBlk=3 and NBlk=4, therefore the smallest NBlk size associated with zone 3 is NBlk=2. The count of histogram 1110 associated with NBlk=2, which is greater than zero, is then decremented from 3 to 2.

Regarding the deallocation of PageUID 7, it is determined that PageUID 7 is associated with zone 3 of partitioning data structure 1120 and that the smallest NBlk size associated with zone 3 is NBlk=2. The count of histogram 1110 associated with NBlk=2 is then decremented from 2 to 1 as shown in FIG. 18.

Referring to histogram 1110 of FIG. 18, the number of physical blocks in use by the object store may be estimated as $(1*2)+(1*3)+(4*4)=17$. Actual row of table 1510 indicates the actual number of physical blocks which are deallocated based on the PageUIDs of table 1510, as noted in table 1210. Deleted row indicates the number of physical blocks estimated to be deallocated based on deallocation of PageUIDs 4, 1, 2, 9 and 7. Specifically, the actual deallocations cause the deallocation of 13 actual physical blocks (leaving 15 physical blocks in use) but processes 1000 and 1400 interact to estimate deallocation of 11 physical blocks (leaving 17 estimated physical blocks). Consequently, in case of the particular allocations and deallocations of the above examples, the estimated number of physical blocks used by the object store is greater than the actual number of used physical blocks.

Figure 19:
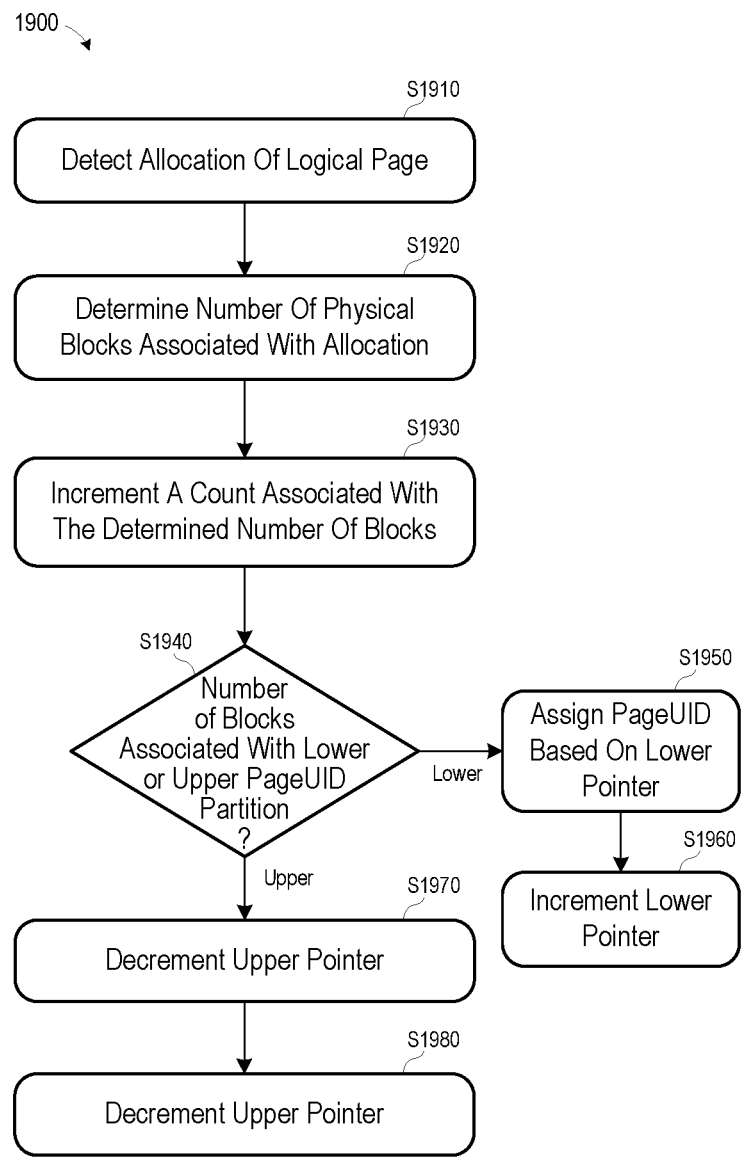
FIG. 19 comprises a flow diagram to manage data structures in response to logical page allocation according to some embodiments.

FIG. 19 is a flow diagram of process 1900 to manage storage-tracking data structures based on page allocations according to some embodiments. As previously described, allocation of a logical page is detected at S1910 and the number of physical blocks associated with the allocation is determined at S1920. A count associated with the determined number of blocks, which may be implemented via a histogram, is then incremented at S1930.

At S1940, it is determined whether the number of blocks is associated with a lower or upper partition of PageUIDs. Process 1000 may utilize a partitioning data structure which partitions a range of PageUIDs into a lower partition corresponding to a range of NBlk sizes (e.g., 1 to 8) and an upper partition corresponding to a range of larger NBlk sizes (e.g., 9 to 16). The PageUIDs of the lower partition and the upper partition are defined by a lower pointer and an upper pointer, which are initially set to the lowest and highest PageUIDs, respectively, of the range of PageUIDs.

If the determined number of blocks is associated with the lower partition, a PageUID is assigned to the allocated page based the lower pointer at S1950 and the lower pointer is incremented at S1960. If the determined number of blocks is associated with the upper partition, a PageUID is assigned to the allocated page based on the upper pointer at S1970 and the upper pointer is decremented at S1980. Examples of PageUID assignment and pointer management will be described below.

Figure 20:
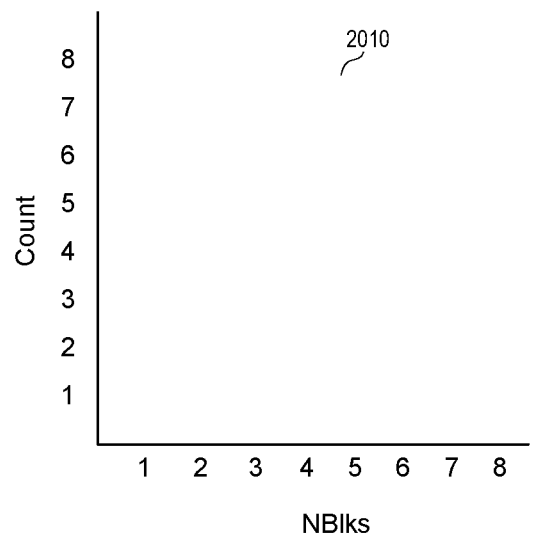
FIGS. 20-26 illustrates management of data structures in response to logical page allocation according to some embodiments.
Figure 20:
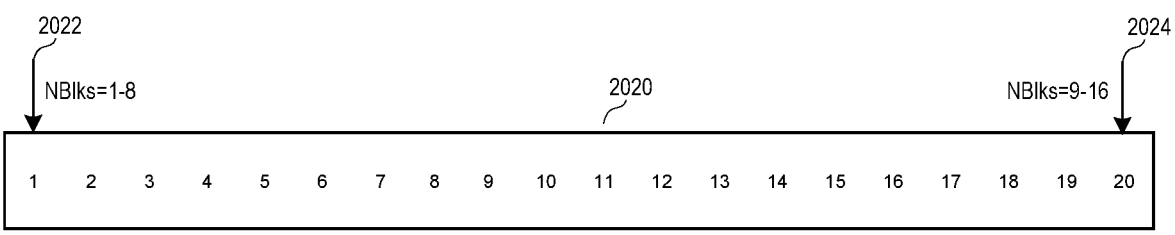

FIG. 20 includes data structures for illustrating operation of process 1900 according to some embodiments. The example below assumes a maximum of 8 physical blocks per logical page but can be extended to account for any number of maximum blocks.

Histogram 2010 maintains a count for each of NBlk sizes 1-8. Partitioning data structure 2020 includes PageUIDs 1-20, with NBlk sizes 1-4 being associated with the lower partition of data structure 2020 and NBlk sizes 5-8 being associated with the upper partition of data structure 2020. As shown, lower pointer 2022 is initially (i.e., prior to any logical page allocations using partitioning data structure 2020) set to PageUID 1 and upper pointer 2024 is initially set to PageUID 20.

Table 2030 will present a sequence of detected page allocations according to the foregoing example. As noted with respect to other tables of page allocates described herein, the data of such a table is not maintained or persisted but is presented to facilitate description of the examples. With reference to table 2030 of FIG. 21, it is assumed that allocation of a two NBlk page is first detected at S1910. The count of histogram 2110 associated with NBlk=2 is therefore incremented from 0 to 1 at S1930. At S1940, it is determined that NBlk=2 is associated with the lower partition of partitioning data structure 2020.

Figure 21:
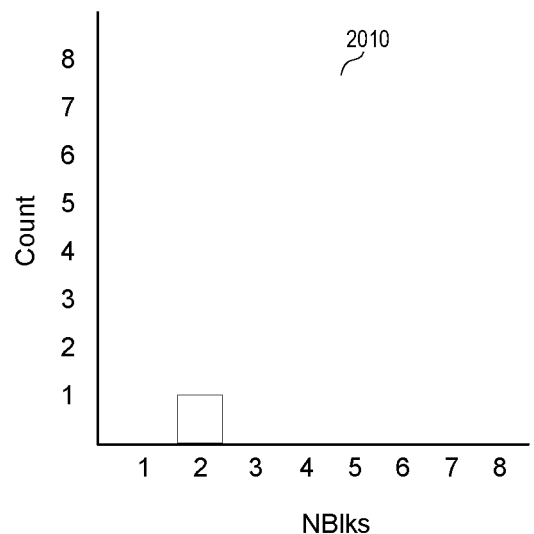
Figure 21:
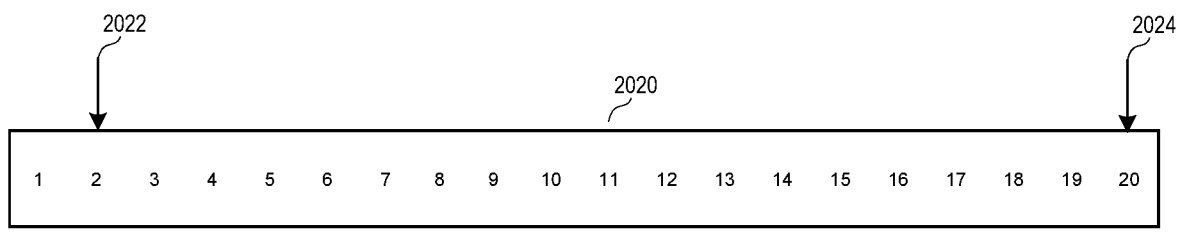

Accordingly, at S1950, the page is assigned a PageUID (i.e., PageUID 1) based on the current value of lower pointer 2022. Lower pointer 2022 is incremented at S1960 as shown in FIG. 21.

Figure 22:
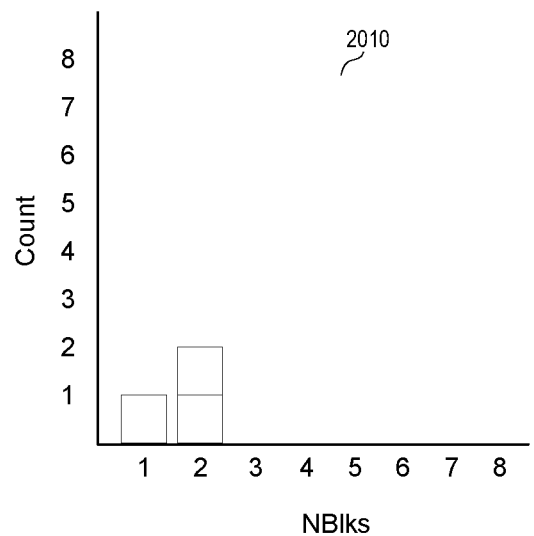
Figure 22:
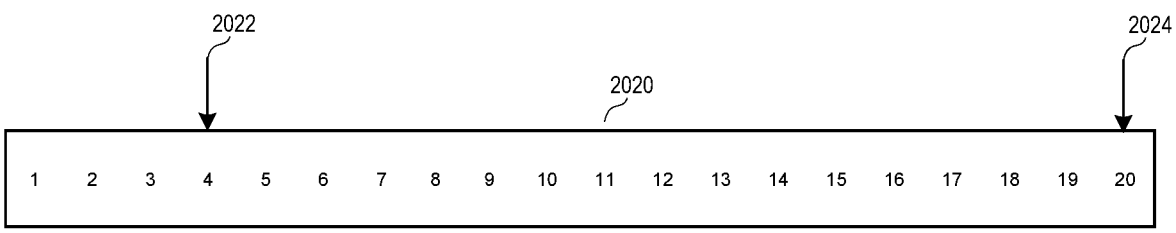

FIG. 22 illustrates the next two detected logical page allocations. First, the allocation of a page of NBlk size 1 is detected, and a count of histogram 2010 associated with NBlk=1 is incremented. Based on the NBlk size, the page is determined to be associated with the lower partition of structure 2020. The page is therefore assigned the then-current PageUID of lower pointer 2022, or Page UID 2, and lower pointer 2022 is incremented from PageUID 2 to PageUID 3.

Next, the allocation of a page of NBlk size 2 is detected, and a count of histogram 2010 associated with NBlk=2 is incremented from 1 to 2. The page is determined to be associated with the lower partition of structure 2020 and is therefore assigned the then-current PageUID of lower pointer 2022, or Page UID 3. Lower pointer 2022 is then incremented from PageUID 3 to PageUID 4.

Figure 23:
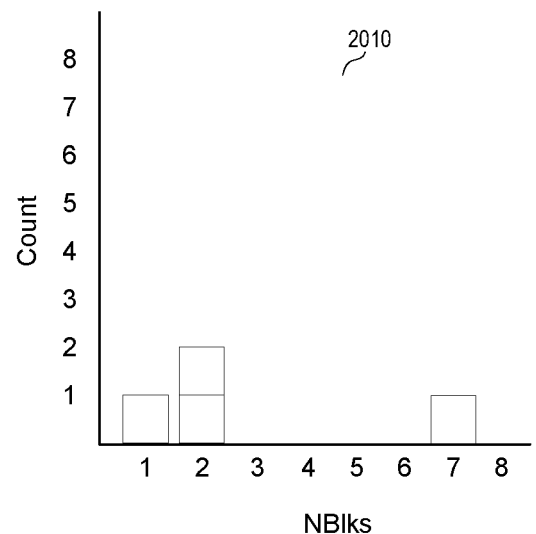
Figure 23:
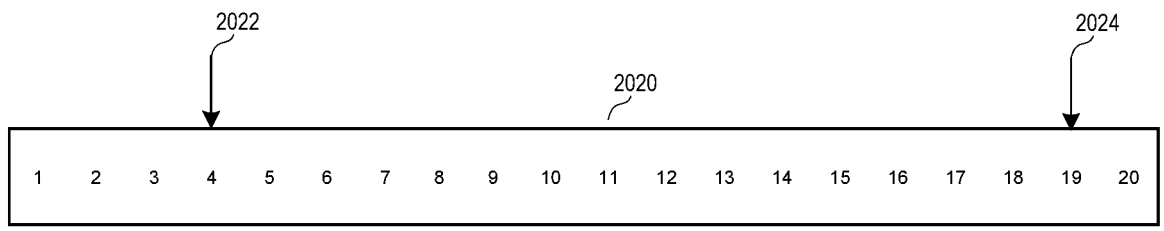

FIG. 23 illustrates the allocation of a page of NBlk size 7. A count of histogram 2010 associated with NBlk=7 is incremented. Based on the NBlk size, the page is determined to be associated with the upper partition of structure 2020. Accordingly, the page is assigned PageUID 20 at S1970, which is the current PageUID of upper pointer 2024. Upper pointer 2024 is then decremented PageUID 20 to PageUID 19 at S1980.

Figure 24:
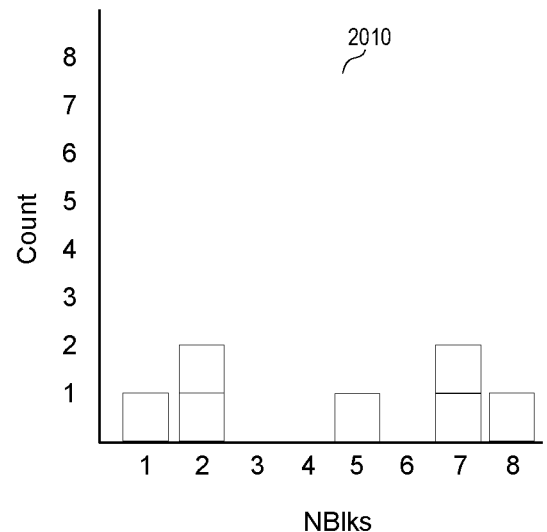
Figure 24:
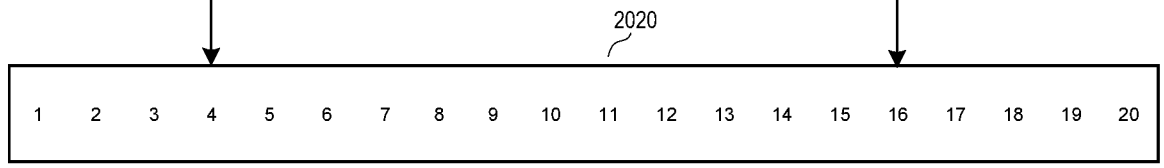

FIG. 24 illustrates allocation of three more logical pages, each of which is associated with the upper partition of partitioning data structure 2020. The corresponding counts of histogram 2010 are incremented, while pointer 2024 is decremented from 19 to 18, 18 to 17, and 17 to 16 as each of the three logical pages is assigned a PageUID based thereon.

Figure 25:
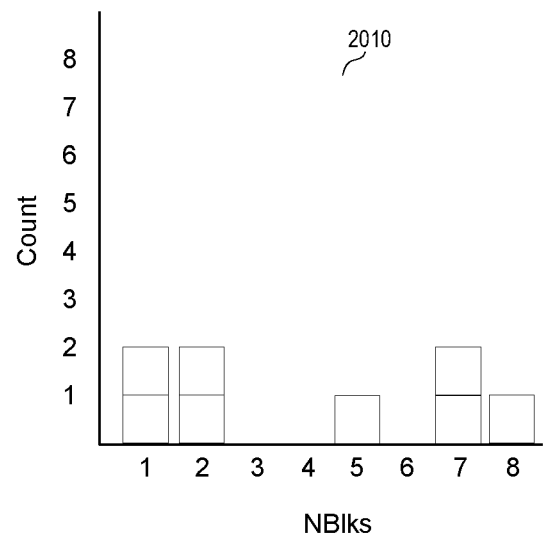
Figure 25:
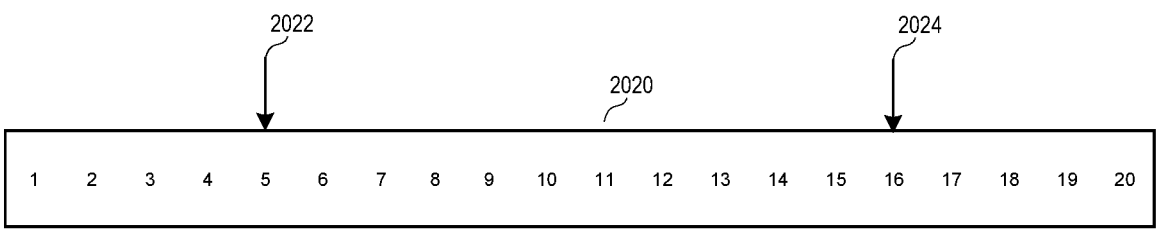
Figure 26:
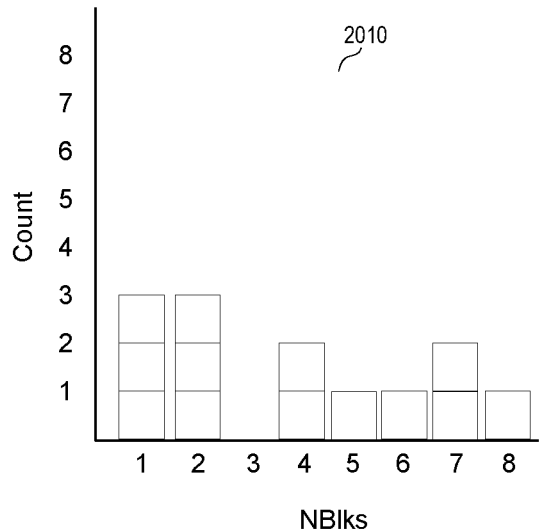
Figure 26:
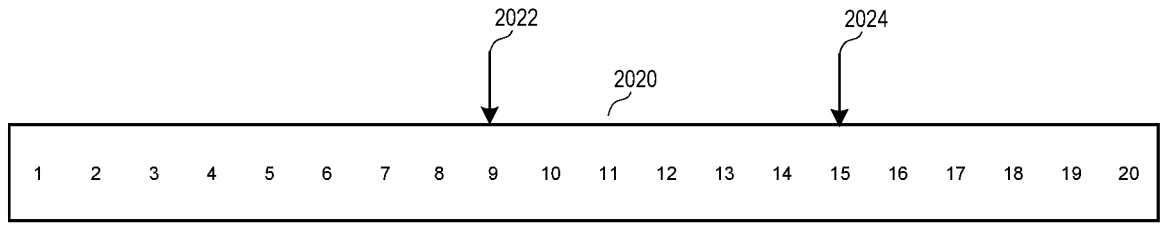

It is assumed in FIG. 25 that allocation of a one NBlk page is next detected. The count of histogram 2110 associated with NBlk=1 is therefore incremented from 1 to 2, and the page is assigned the current PageUID of lower pointer 2022, or PageUID 4. Lower pointer 2022 is then incremented from 4 to 5. FIG. 26 illustrates the allocation of an additional five logical pages, their assigned PageUIDs, and the resulting changes to histogram 2010 and pointers 2022, 2024 according to process 1900.

Figure 27:
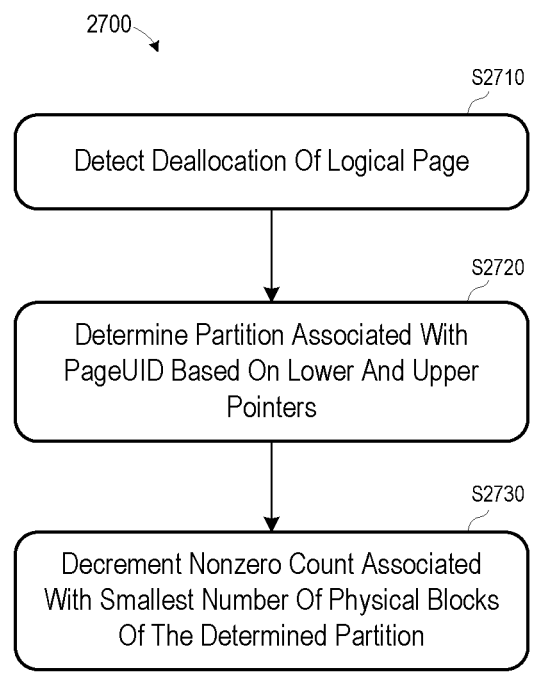
FIG. 27 comprises a flow diagram to manage data structures in response to logical page deallocation according to some embodiments.

FIG. 27 comprises a flow diagram of process 2700 to manage data structures created by process 1900 in response to logical page deallocation according to some embodiments. Initially, at S2710, deallocation of a logical page having a particular PageUID is detected. The partition with which the PageUID is associated is determined at S2720 based on the current values of the lower pointer and the upper pointer. Next, at S2730, a non-zero count associated with the smallest NBlk size of the determined partition is decremented.

Figure 28:
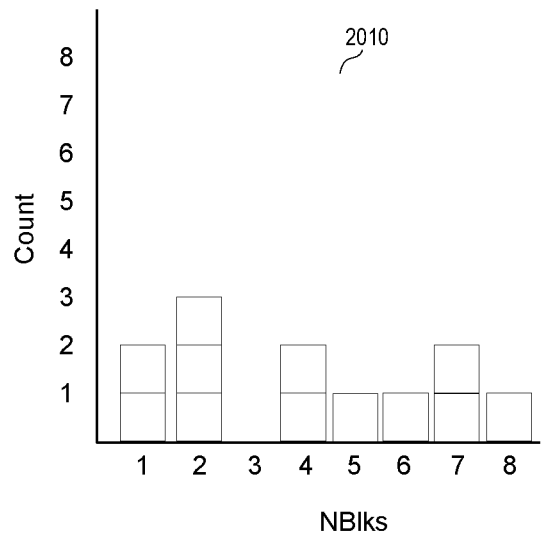
FIG. 28-31 illustrates management of data structures in response to logical page deallocation according to some embodiments.
Figure 28:
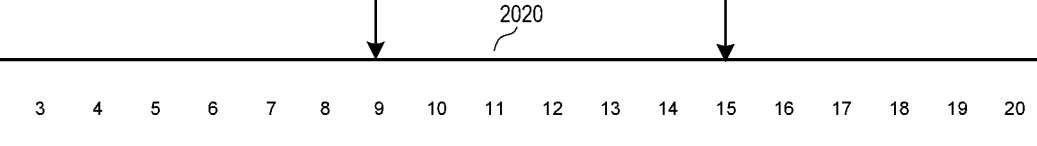
Figure 29:
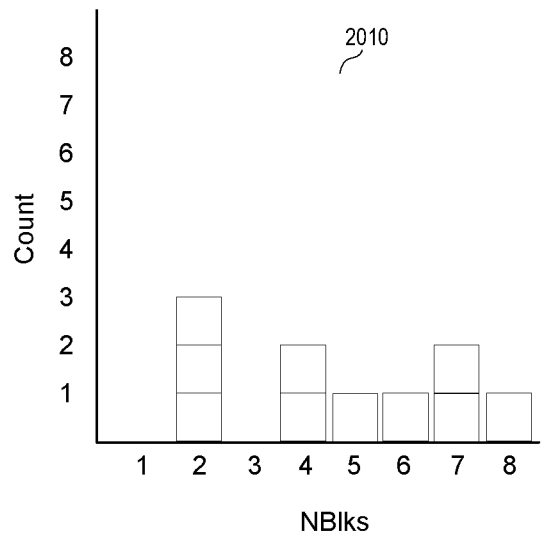
Figure 29:
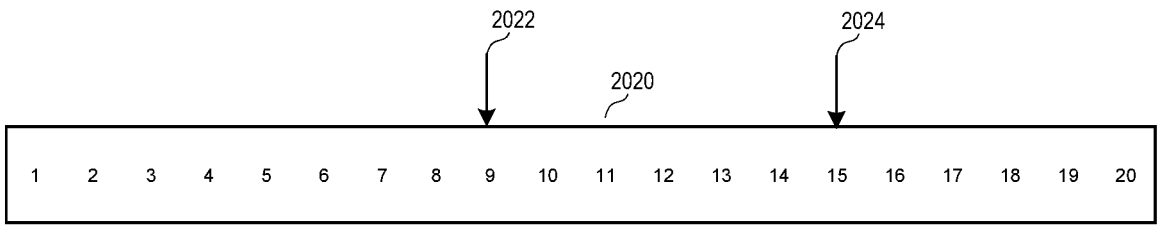
Figure 30:
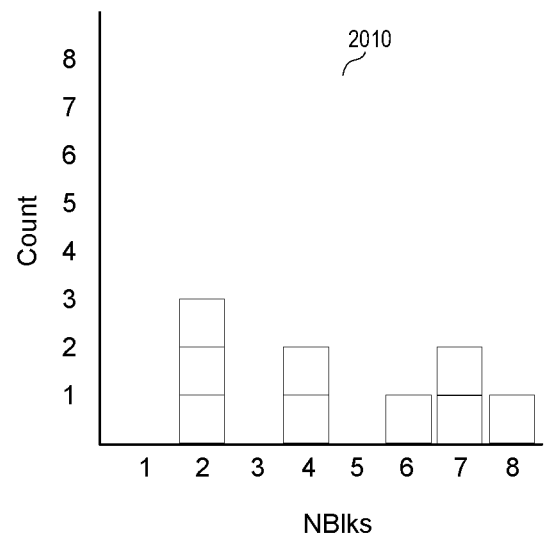
Figure 30:
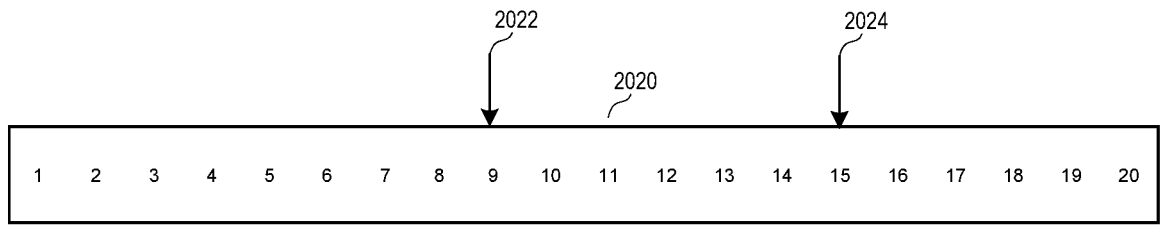

FIGS. 28-30 illustrate operation according to some embodiments of process 2700 based on data structures populated according to the above example of process 1900. For example, partitioning data structure 2020 and pointers 2022, 2024 reflect the allocations of table 1210 as described above.

Table 2810 indicates page deallocations which are detected at S2710 in the present example. In particular, deallocation of PageUID 4 is first detected. PageUID 4 is determined to be smaller than the value (i.e., 9) of lower pointer 2022 and therefore the PageUID is determined to be associated with the lower partition of partitioning data structure 2020. The lower partition is associated with NBlk sizes 1-4, and NBlk=1 is the smallest of these NBlk sizes which is associated with a non-zero count of histogram 2010. Accordingly, the count of histogram 2010 associated with NBlk=1 is decremented from 3 to 2 at S2730.

Table 2810 of FIG. 29 reflects subsequent deallocations of PageUIDs 1 and 7. Both pageUIDs are less than value 9 of pointer 2022 and are therefore determined to be associated with the lower portion of partitioning data structure 2020. The count of histogram 2010 associated with NBlk=1 is therefore decremented from 2 to 1 in response to deallocation of PageUID 1 and from 1 to 0 in response to deallocation of PageUID 7 as shown in FIG. 29.

PageUID 19 is then deallocated as shown in table 2810 of FIG. 30. PageUID 19 is determined to be greater than the value (i.e., 15) of upper pointer 2024 and therefore PageUID 19 is determined to be associated with the upper partition of partitioning data structure 2020. NBlk=5 is the smallest of the NBlk sizes associated with the upper partition and is associated with a non-zero count of histogram 2010. The count of histogram 2010 associated with NBlk=5 is therefore decremented from 1 to 0 at S2730.

Figure 31:
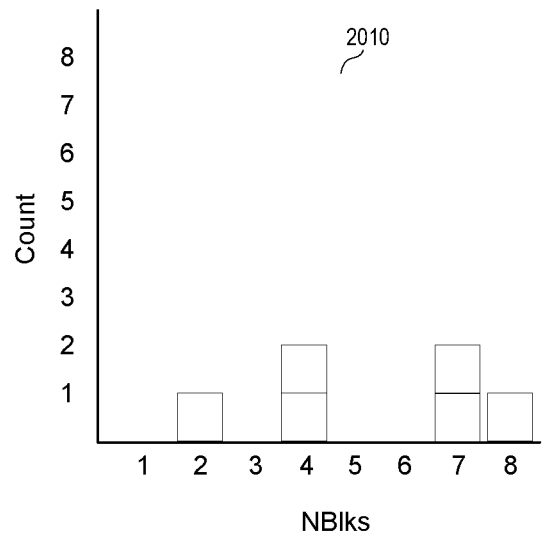
Figure 31:
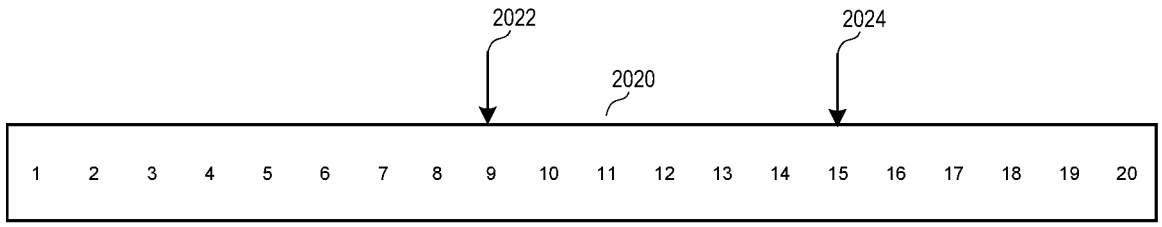

Table 2810 of FIG. 31 reflects subsequent deallocations of PageUIDs 5, 18 and 6. PageUID 5 is determined to be associated with the lower partition of partitioning data structure 2020. However, NBlk=2 is now the smallest NBlk size of the lower partition which is associated with a non-zero count in histogram 2010. Accordingly, the count of histogram 2010 associated with NBlk=2 is decremented from 3 to 2 in response to the deallocation of PageUID 5.

Similarly, deallocated PageUID 18 is associated with the upper partition of partitioning data structure 2020 but the smallest NBlk size (i.e., 5) of the upper partition is associated with a zero count in histogram 2010. Accordingly, the count of histogram 2010 associated with the next-smallest NBlk size (i.e., 6) is decremented from 1 to 0 in response to the deallocation of PageUID 18.

Next deallocated PageUID 6 is determined to be associated with the lower partition of partitioning data structure 2020 and NBlk=2 is still the smallest NBlk size of the lower partition which is associated with a non-zero count in histogram 2010. As shown in FIG. 31, the count of histogram 2010 associated with NBlk=2 is decremented from 2 to 1 in response to the deallocation of PageUID 6.

At this point, histogram 2010 of FIG. 31 estimates that the number of physical blocks in use by the object store is $(1*2)+(2*4)+(2*7)+(1*8)=32$. Actual row of table 2810 indicates the actual number of physical blocks (per the allocations of table 2030) which are deallocated based on the deallocated PageUIDs of table 2810. The actual deallocations cause the deallocation of 28 actual physical blocks, leaving 22 actual physical blocks in use. Deleted row indicates the number of physical blocks estimated to be deallocated based on deallocation of PageUIDs 4, 1, 7, 19, 5, 18 and 6. The estimate totals 18 deallocated physical blocks, leaving 32 estimated physical blocks in use as noted above.

As is known in the art, a database system may be distributed, in which different database nodes perform write operations on a common object store. Embodiments may include processes to manage the data structures described herein in response to page allocations and deallocations in a distributed environment so that overall usage of the common object store at a given time can be efficiently estimated.

Figure 32:
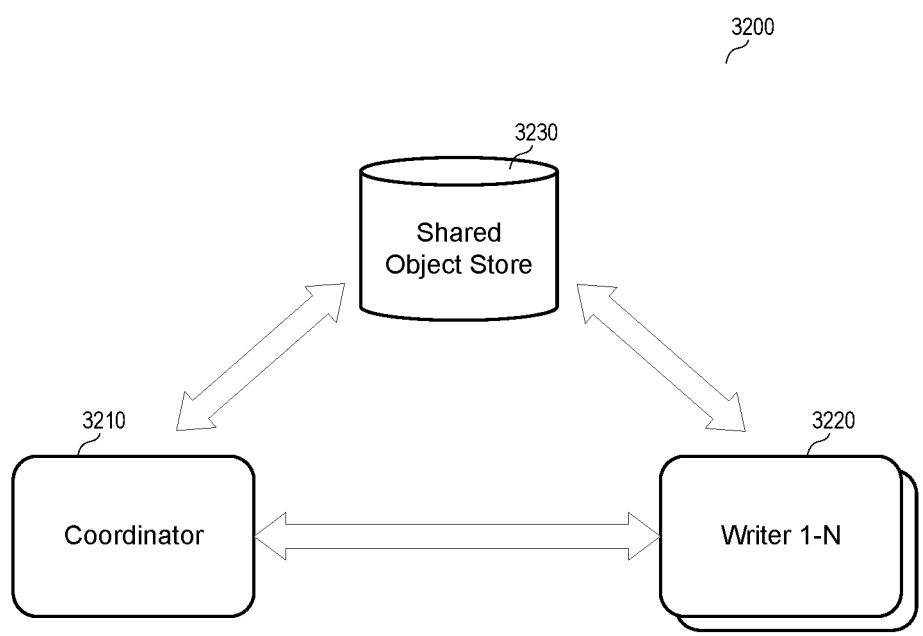
FIG. 32 illustrates a distributed database system according to some embodiments.

FIG. 32 is a block diagram of distributed database system 3200 according to some embodiments. System 3200 includes coordinator node 3210 and 1-N writer nodes 3220. Object store 3230 consists of a shared dbspace to/from which coordinator 3210 and writer nodes 3220 can write/read. System 3200 may also include reader nodes, which are not illustrated herein because such nodes do not perform page allocations or deallocations. Each node of system 3200 may comprise a cluster of distributed servers. Embodiments may operate to seamlessly add or remove one or more writer nodes 3220 nodes as needed.

In some embodiments, coordinator node 3210 is responsible for transaction lifecycle management, Data Description Language operations, and configuration management of system 3200 and writer nodes 3220. Writer nodes 3220 are responsible for data load/unload, Data Manipulation Language operations, and query operations. Coordinator node 3210 may perform the functions of a writer node in some embodiments. Database system 3200 may implement Multi-Version Concurrency Control with table-level versioning and snapshot isolation.

Coordinator node 3210 receives request for PageUIDs from writer nodes 3220 and allocates PageUIDs to requesting nodes in ranges and in a monotonically increasing fashion. For example, a writer node 3220 may request 100 PageUIDs from coordinator node 3210. In response, coordinator node 3210 generates PageUIDs 0-99, stores a record associating the range of PageUIDs with the requesting writer node 3220, and provides PageUIDs 0-99 to the requesting writer node 3220. The requesting writer node 3220 caches the provided PageUIDs and allots pages for write operations from the received range of PageUIDs. Once a writer node 3220 has used all the PageUIDs of the range, it may request coordinator node 3210 to allocate a new pageUID range.

Caching the allocated keys locally avoids a need to issue expensive RPC calls to coordinator node 3210 every time a new object key is needed. According to some embodiments, the number of keys requested (i.e., range size) by a writer node 3220 starts at a default value and dynamically increases or decreases on subsequent RPC calls based on the load on the node.

Each of coordinator node 3210 and writer nodes 3220 includes a local copy of a histogram, a zone map, and a partitioning data structure for each range of PageUIDs allocated thereto. Generally, each writer node 3220 updates its local data structures as described above based on allocations and deallocations which it initiates, and the local data structures of all writer nodes 3220 are used to update the data structures of coordinator node 3210. Accordingly, the data structures of coordinator node 3210 eventually reflect all allocations and deallocations within database system 3200.

Figure 33:
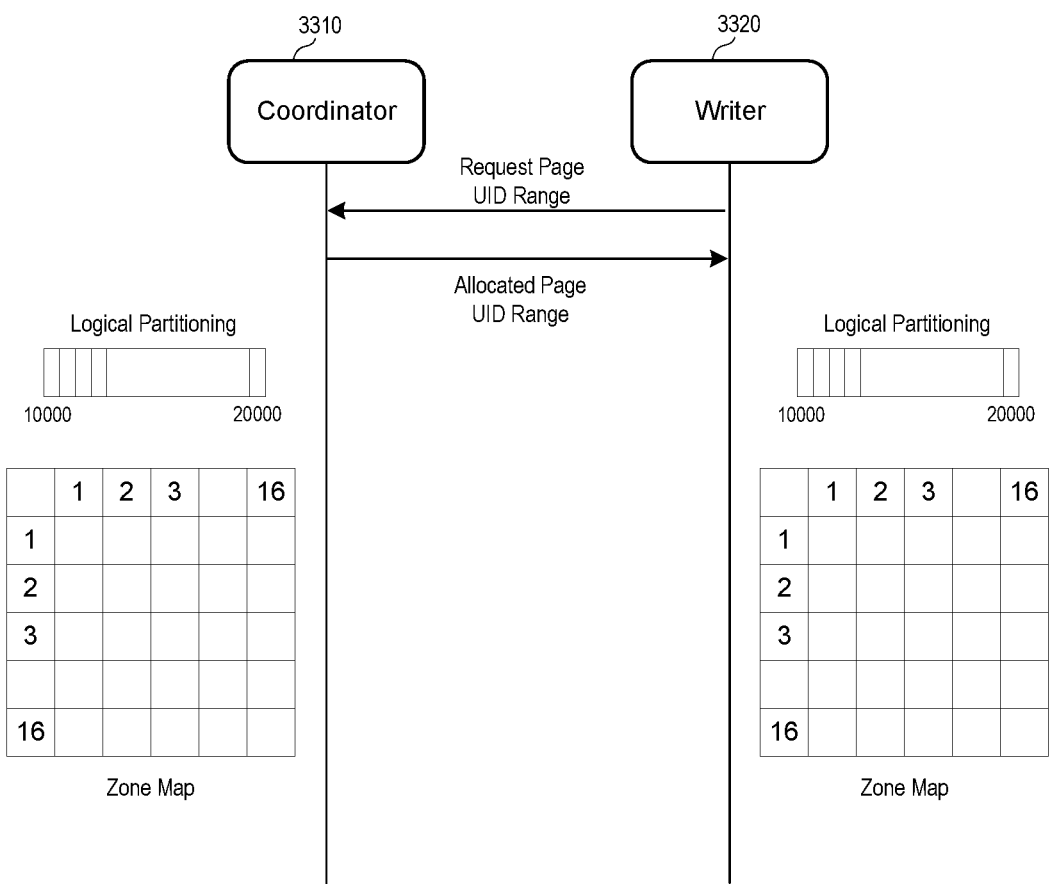
FIGS. 33-35 illustrate management of data structures for storage monitoring among the nodes of a distributed database system according to some embodiments.

FIG. 33 is a sequence diagram in which writer node 3320 requests a PageUID range from coordinator node 3310. Coordinator node 3310 allocates a PageUID range (e.g., 10,000-20,000) for writer node 3320 and maintains a record associating the PageUID range with writer node 3320. Writer node 3320 receives the PageUID range allocation from coordinator node 3310 and initializes a local histogram, zone map and partitioning data structure corresponding to the PageUID range. In the illustrated example, a logical page may correspond to 1-16 physical blocks and the partitioning data structure therefore divides the PageUID range into 16 portions, each of which might contain an equal number of PageUIDs.

In some embodiments, writer node 3320 updates its local data structures after a local transaction is committed. The local data structures are then periodically synced with coordinator node 3310. The synced data is preferably only the data which has changed since a last sync (i.e., the delta).

Figure 34:
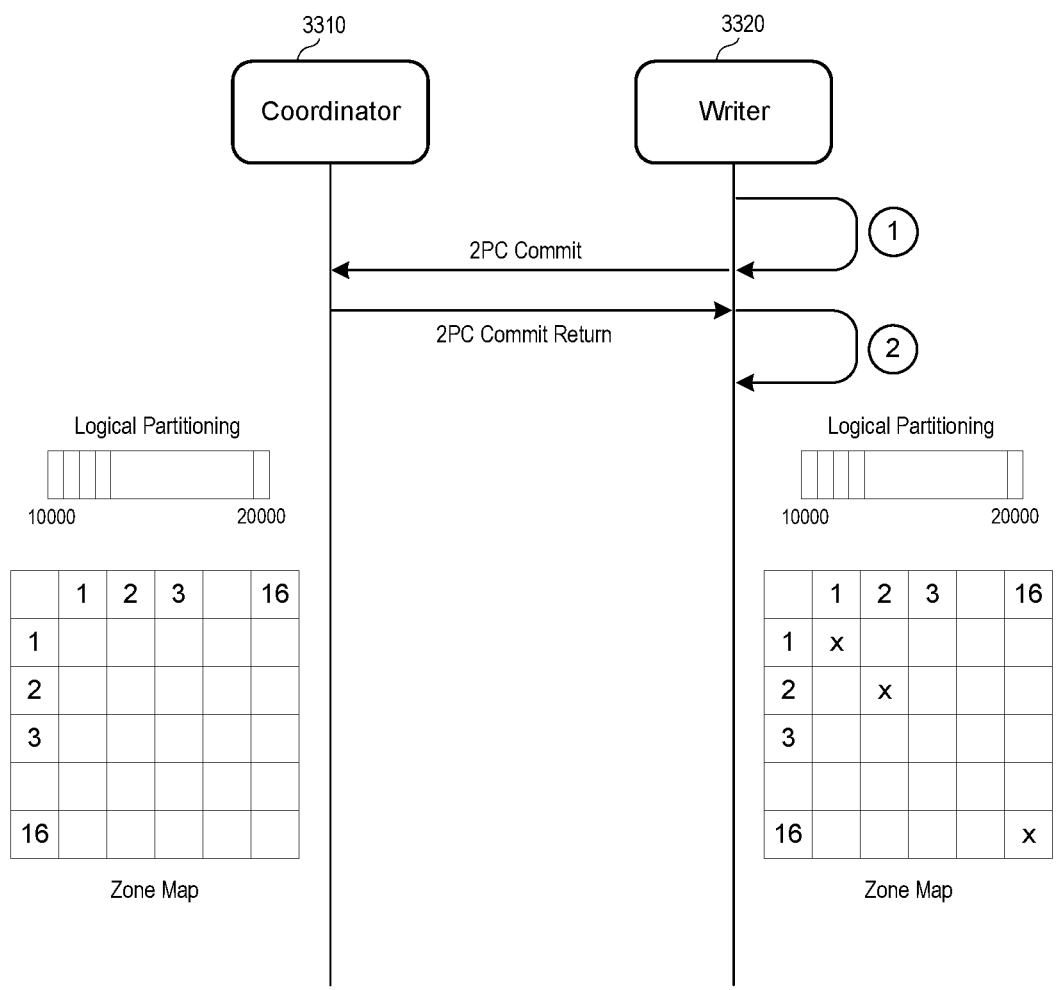

In the example of FIG. 34, and as indicated by circled numeral 1, a transaction on writer 3320 has allocated and written three pages of 1, 2 and 16 blocks per page. Based on the logical partitioning of pageUID range 10000 to 20000 into 16 equal portions, and on embodiments of process 1000, pageUID 10001 is assigned to the first (NBlk=1) page, pageUID 10626 is assigned to the second (NBlk=2) page and pageUID 19376 is assigned to the third (NBlk=16) page.

While sending a commit request to coordinator node 3310, writer 3320 node shares commit-specific information and the allocated PageUIDs with coordinator node 3310. Also, after the transaction has been committed, and as indicated by circled numeral 2, writer node 3320 updates its local zone map and histogram which are associated with the PageUID range.

Figure 35:
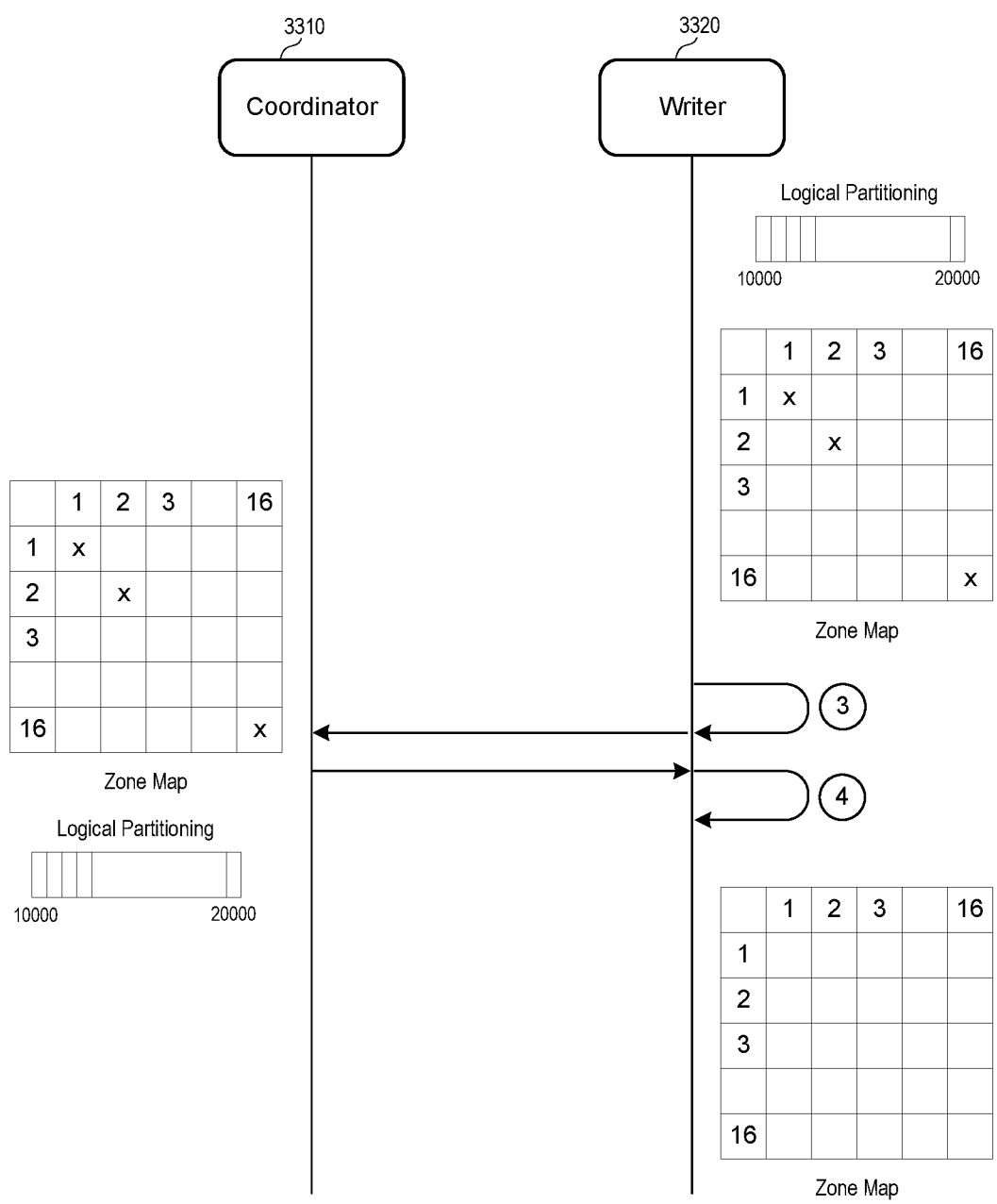

FIG. 35 illustrates operation of writer node 3320 after subsequent expiration of a sync timeout. Circled numeral 3 represents transmission of the data of the local zone map and histogram from writer 3320 to coordinator 3310. Coordinator 3310 updates its local zone map and histogram based on the transmitted data. After successfully sending the data, writer node 3320 clears the data from its local zone map and histogram (circled numeral 4) so that the next sync operation will send only the delta information to coordinator node 3310.

The foregoing process requires handling of several potential crash scenarios. For example, writer 3320 might crash after a local transaction is committed but before updating its local zone map and histogram. According to another scenario, writer 3320 crashes after a transaction is committed but prior to syncing its correspondingly-updated local data structures with coordinator 3310. In either of the above cases, coordinator node 3310 will experience an error if it attempts to delete the pages allocated by the transaction, since the transaction is not reflected in the global data structures maintained by coordinator node 3310.

Writer node 3320 may crash before commit of a transaction is successful. In such a case, writer node 3320 discards any PageUID allocations which resulted from the transaction, so that the PageUIDs can be used by future transactions within writer node 3320.

Figure 36:
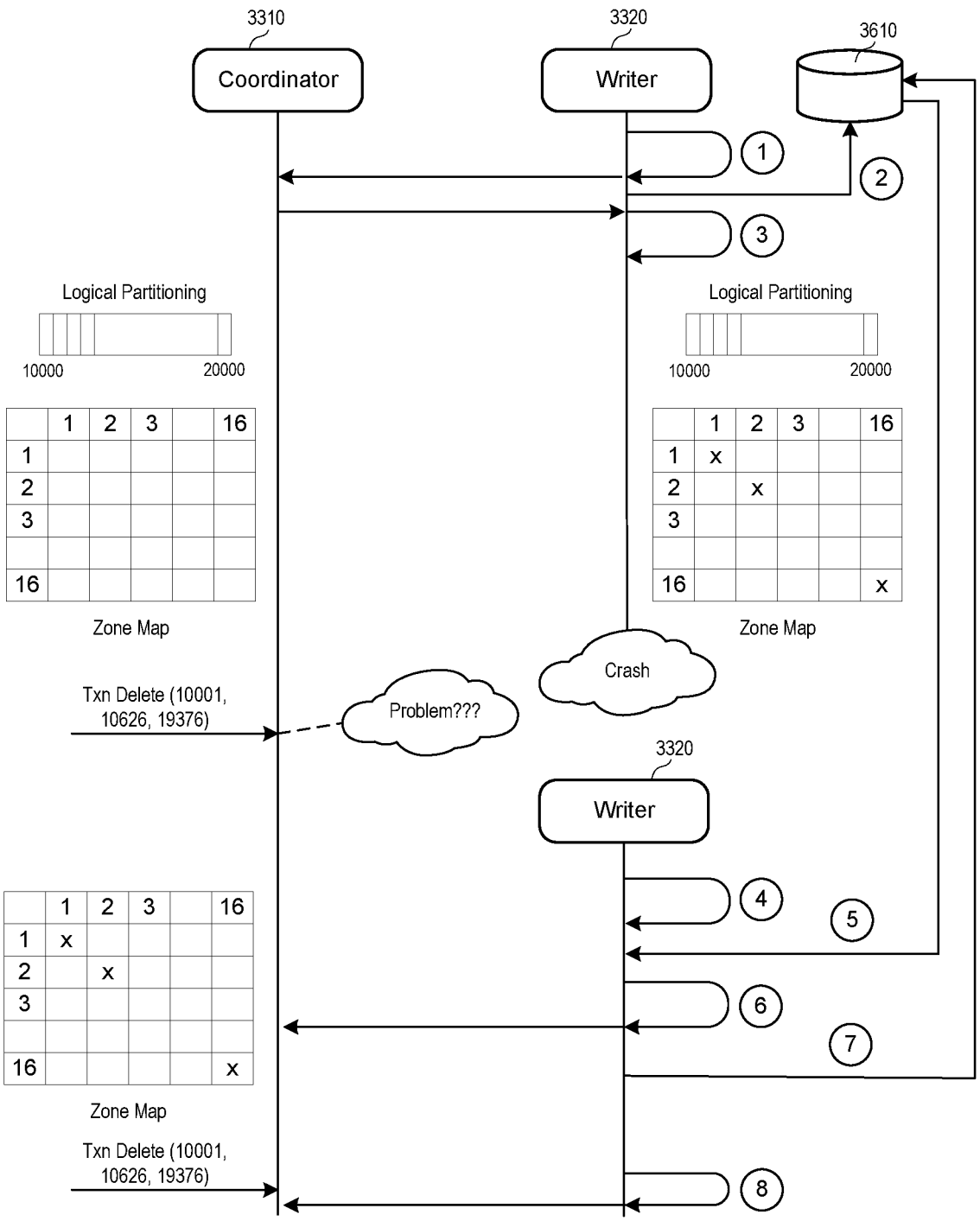
FIGS. 36-38 illustrate management of data structures for storage monitoring among the nodes of a distributed database system using persisted write-ahead logs according to some embodiments.

FIG. 36 illustrates crash recovery using a write ahead logging mechanism according to some embodiments. Prior to committing a transaction, writer node 3320 (e.g., at circled numeral 2) persists information such as transaction id, pageUIDs and corresponding number of blocks, or data structures such as the zone map and histogram into persisted storage 3610. The transaction is committed and writer node 3320 updates the local data structures at circled numeral 3.

It is assumed that writer node 3320 crashes prior to syncing its updated data structures with coordinator node 3310. Upon restart of writer node 3320 at circled numeral 4, writer node 3320 reads the persisted information (e.g., at circled numeral 5) and sends that information to coordinator node 3310 along with a start ack at circled numeral 6. Writer node 3320 then clears the information from persisted storage 3610 at circled numeral 7.

Coordinator node 3310 updates the global data structures based on the received information. Writer node 3320 may then discard its existing allocated range of PageUIDs and request a new range of PageUIDs from coordinator node 3310.

Figure 37:
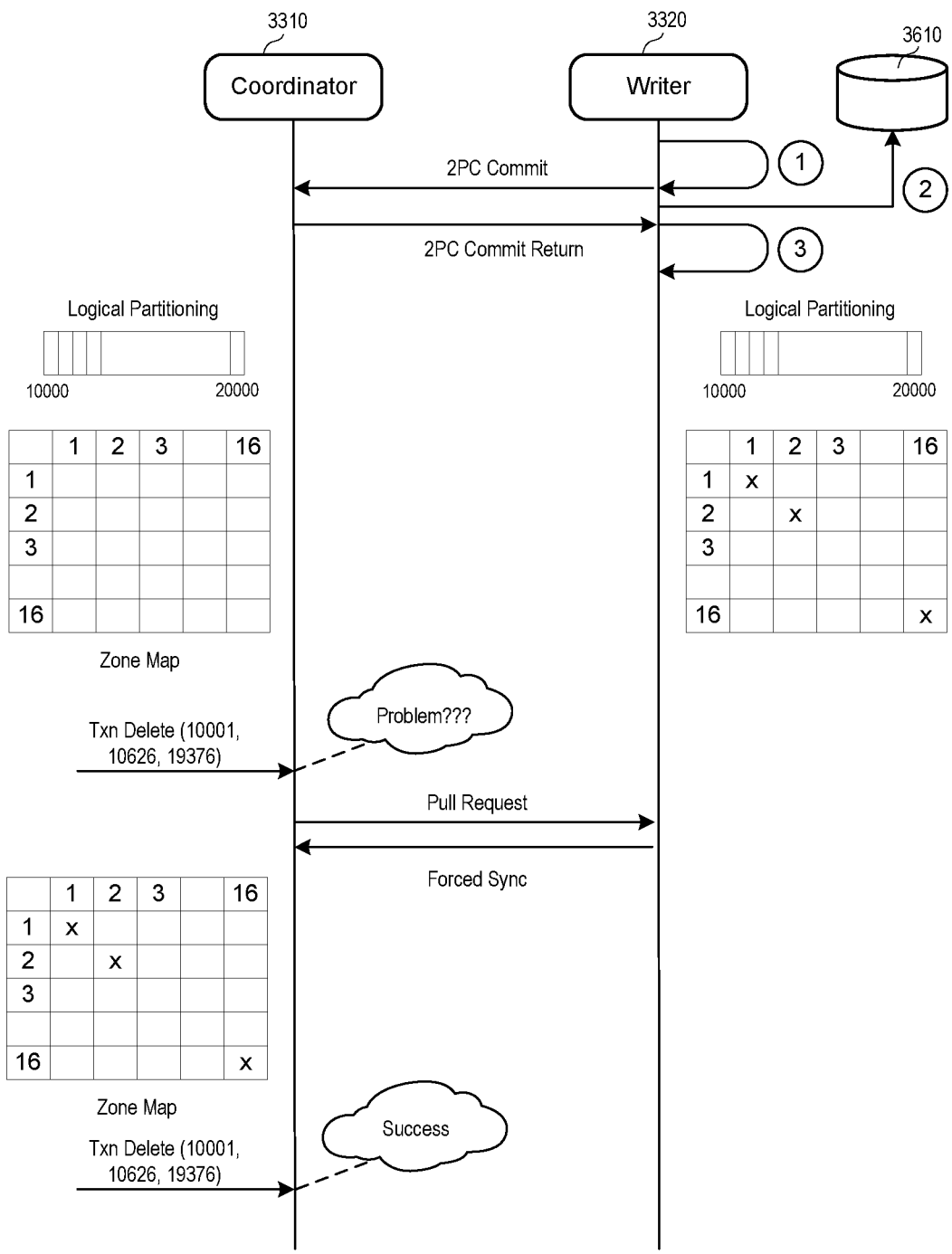

FIG. 37 illustrates a scenario in which a transaction is committed on writer node 3320 and the local data structures are updated on writer 3320 as described above. However, the sync timeout is not triggered so the local the data structures are not synched to coordinator node 3310. An error therefore occurs if other transactions delete the same pages but the global data structures of coordinator 3310 do not reflect creation of the pages (i.e., a corresponding histogram count is 0).

Therefore, if the writer node which is assigned a PageUID range including the PageUIDs of the deleted pages is live and running, coordinator node 3310 issues a pull request to the writer node to force a sync of its local data structures. Coordinator node 3310 updates the global data structures based on the received information and updates its data structures based on the deleted pages.

Figure 38:
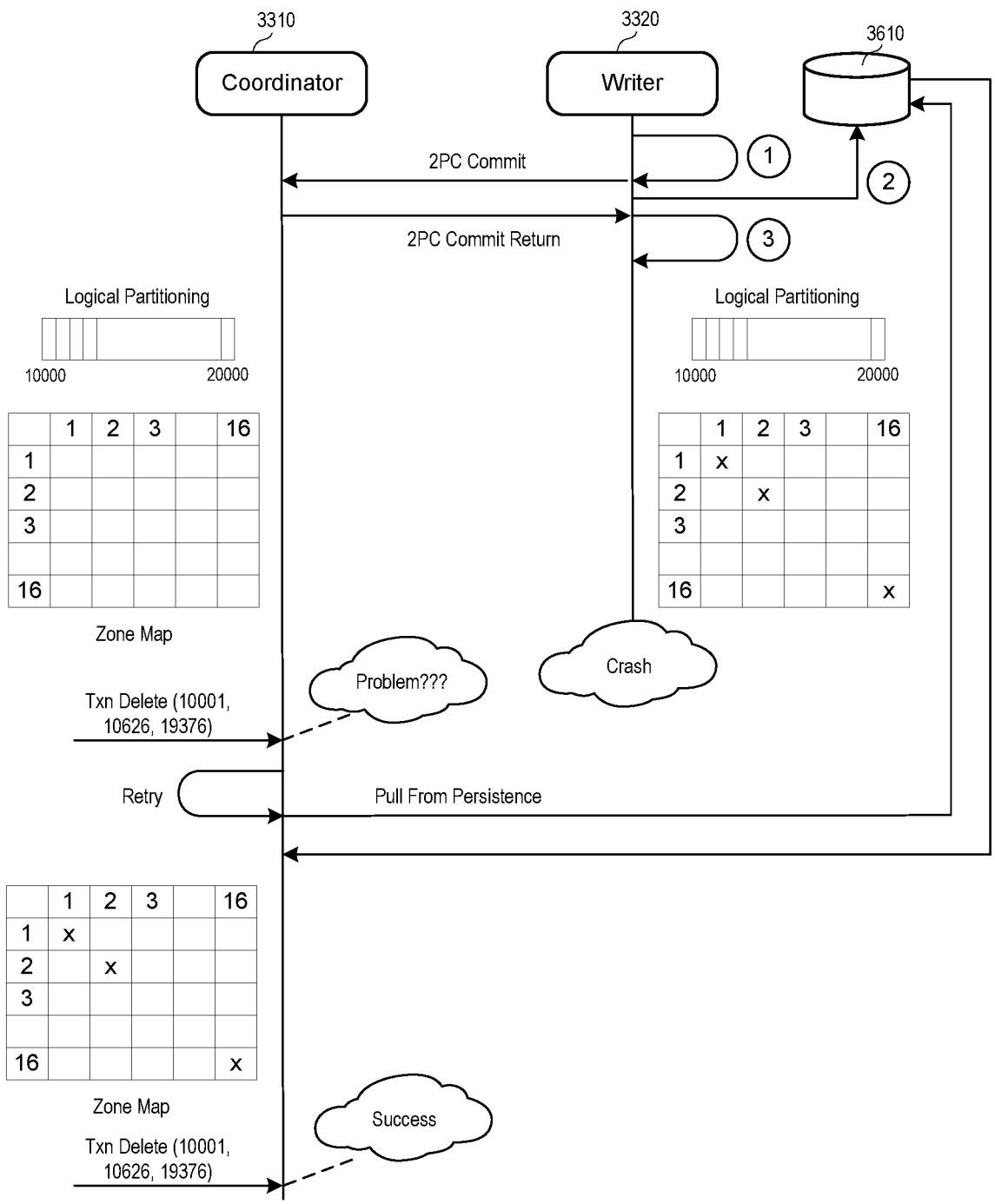

As shown in FIG. 38. if the writer node which is assigned the PageUID range including the PageUIDs of the deleted pages has crashed and is unable to restart, or another communication error exists, coordinator 3310 may, after a certain number of retries, pull the required information from shared persisted storage 3610. If the writer node reboots prior to sync of its local data structures, the local data structures may be updated based on the information of shared persisted storage 3610.

If data structure updates based on a new page allocation on a writer node are not synced to coordinator 3310 for any of the reasons above but a corresponding histogram value of the global histogram on coordinator node 3310 structure is non-zero, coordinator node 3310 decrements that histogram value of the global histogram to reflect the page deletion. The new page allocation on the writer node is then reflected in the global histogram of coordinator node 3310 upon a next sync of the local data structure of the writer node.

Figure 39:
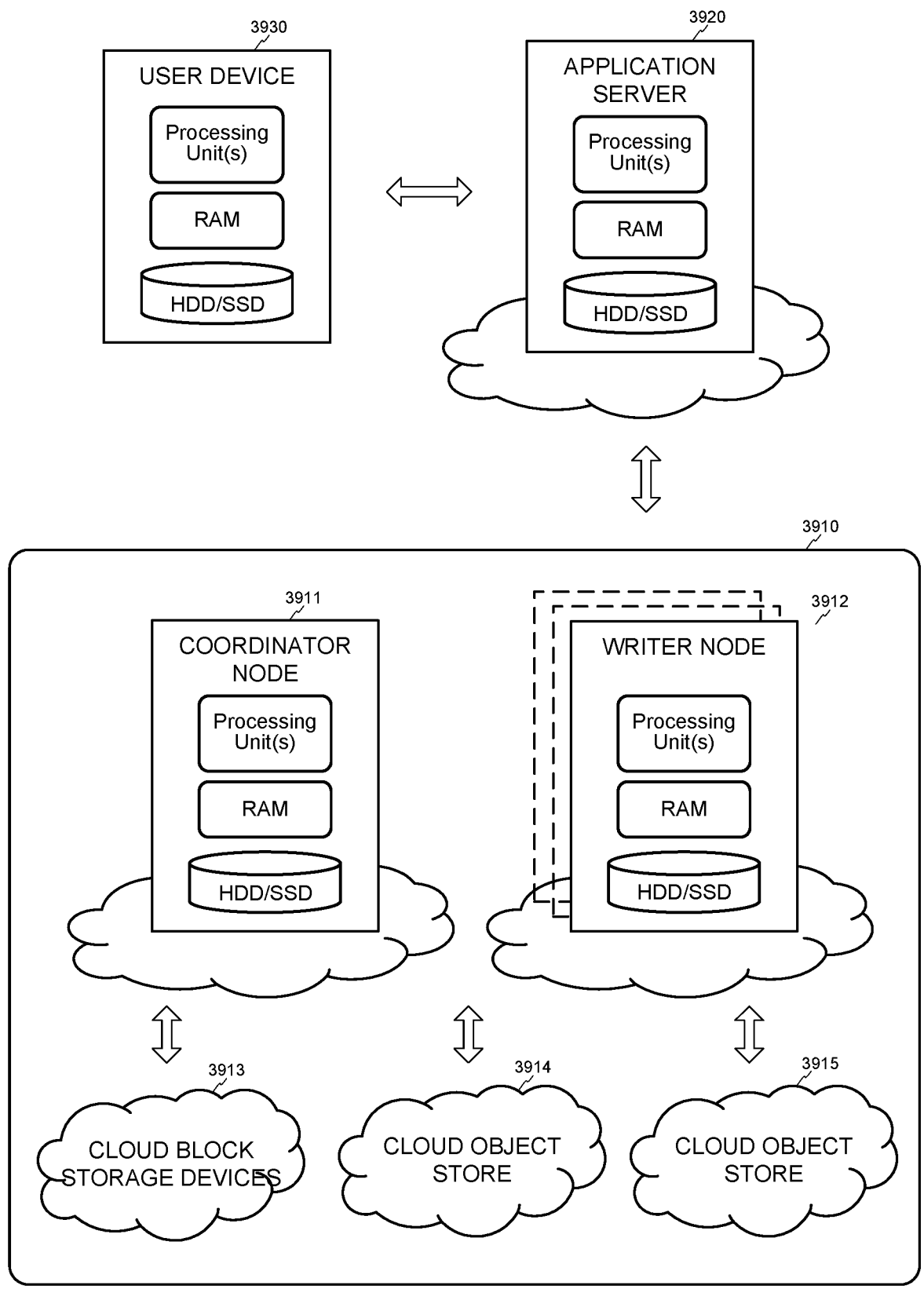
FIG. 39 is a view of a cloud-based distributed database architecture according to some embodiments.

FIG. 39 illustrates a cloud-based database deployment according to some embodiments. The illustrated components may reside in one or more public clouds providing self-service and immediate provisioning, autoscaling, security, compliance and identity management feature.

Database system 3910 includes coordinator node 3911, writer nodes 3912, cloud-based block storage devices 3913 and cloud object stores 3914 and 3915. As described herein, nodes 3911 and 3912 may operate to write and delete pages of file-based database spaces to/from cloud-based block storage devices 3913 and pages of cloud-based database spaces to/from cloud object stores 3914 and 3915. Nodes 3911 and 3912 may operate to manage data structures as described herein in response to page allocations and deallocations. Coordinator node 3911 may also be responsive to requests for estimation of object store memory usage, and use such data structures to estimate the usage as described herein.

Each of coordinator node 3911 and writer nodes 3912 may comprise a cloud-based compute resource, such as a virtual machine, provided by a public cloud provider. Cloud-based block storage devices 3913 may comprise reserved block storage devices for use by any of nodes 3911 and 3912, and cloud object stores 3914 and 3915 may comprise key-value object stores. Two or more nodes or data stores may be provided by different public cloud providers.

Application server 3920 may also comprise a cloud-based compute resource allocated by a public cloud provider. As such, application server 3920 may also exhibit demand-based elasticity. User device 3930 may interact with applications executing on application server 3920, for example via a Web Browser executing on user device 3930, in order to create, read, update and delete data managed by database management system 3910.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation described herein may include a programmable processor to execute program code such that the computing device operates as described herein.

All systems and processes discussed herein may be embodied in program code stored on one or more non-transitory computer-readable media. Such media may include, for example, a hard disk drive, a DVD-ROM, a Flash drive, magnetic tape, and solid state Random Access Memory or Read Only Memory storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   an object store;
   a memory storing a first data structure associating a respective count with each of a plurality of memory sizes, the count associated with a given memory size indicating a number of times the given memory size was allocated for storage of a logical page; and
   a storage monitor to:
   detect a first allocation of a first memory size in the object store for storage of a first logical page;
   in response to detection of the first allocation, increment a first count of the first data structure indicating a number of times the first memory size was allocated for storage of a logical page;
   detect a first deallocation of the first logical page; and
   in response to detection of the first deallocation, decrement a second count of the first data structure indicating a number of times a second one of the plurality of memory sizes was allocated for storage of a logical page,
   wherein the second one of the plurality of memory sizes is different from the first memory size.

2. A system according to claim 1, the storage monitor further to:
   determine a memory usage associated with the object store based on the counts associated with each of the plurality of memory sizes by the first data structure.

3. A system according to claim 2, wherein decrementing the second count indicating the number of times the second one of the plurality of memory sizes was allocated for storage of a logical page comprises:
   in response to detection of the first deallocation, determine that the second one of the plurality of memory sizes is the smallest of the plurality of memory sizes associated with a non-zero count by the first data structure; and
   in response to the determination that the second one of the plurality of memory sizes is the smallest of the plurality of memory sizes associated with a non-zero count by the first data structure, decrement the second count indicating the number of times the second one of the plurality of memory sizes was allocated for storage of a logical page.

4. A system according to claim 1, the storage monitor to:
   in response to detection of the first allocation, determine a first PageUID zone associated with the first memory size by a second data structure, assign a PageUID of the first PageUID zone to the first logical page, and modify a third data structure to associate the first memory size with the first PageUID zone.

5. A system according to claim 4, the storage monitor to:
   detect a second allocation of the first memory size in the object store for storage of a second logical page;
   in response to detection of the second allocation, increment the first count of the first data structure indicating a number of times the first memory size was allocated for storage of a logical page, determine the first PageUID zone associated with the first memory size by the second data structure, and determine that all page PageUIDs of the first PageUID zone have been assigned; and
   in response to the determination that all page PageUIDs of the first PageUID zone have been assigned, identify a second PageUID zone including at least one unassigned PageUID, assign a PageUID of the second PageUID zone to the second logical page, and modify the third data structure to associate the first memory size with the second PageUID zone,
   wherein the second PageUID zone is associated with a third memory size.

6. A system according to claim 1, the storage monitor to:
   in response to detection of the first allocation, determine a first PageUID partition associated with the first memory size, assign a PageUID to the first logical page based on a first pointer associated with the first PageUID partition, and increment the first pointer.

7. A system according to claim 6, the storage monitor to:
detect a second allocation of a second memory size in the object store for storage of a second logical page; and
in response to detection of the second allocation, determine a second PageUID partition associated with the first memory size, assign a PageUID to the second logical page based on a second pointer associated with the second PageUID partition, and decrement the second pointer.

8. A method comprising:
detecting a first allocation of a first memory size in an object store for storage of a first logical page;
in response to detection of the first allocation, incrementing a first count of a first data structure indicating a number of times the first memory size was allocated for storage of a logical page, the first data structure associating a respective count with each of a plurality of memory sizes, the respective count associated with a given memory size indicating a number of times the given memory size was allocated for storage of a logical page;
detecting a first deallocation of the first logical page; and
in response to detection of the first deallocation, decrementing a second count of the first data structure indicating a number of times a second one of the plurality of memory sizes was allocated for storage of a logical page,
wherein the second one of the plurality of memory sizes is different from the first memory size.

9. A method according to claim 8, further comprising:
determine a memory usage associated with the object store based on the counts associated with each of the plurality of memory sizes by the first data structure.

10. A method according to claim 9, wherein decrementing the second count indicating the number of times the second one of the plurality of memory sizes was allocated for storage of a logical page comprises:
in response to detection of the first deallocation, determining that the second one of the plurality of memory sizes is the smallest of the plurality of memory sizes associated with a non-zero count by the first data structure; and
in response to the determination that the second one of the plurality of memory sizes is the smallest of the plurality of memory sizes associated with a non-zero count by the first data structure, decrementing the second count indicating the number of times the second one of the plurality of memory sizes was allocated for storage of a logical page.

11. A method according to claim 8, further comprising:
in response to detection of the first allocation, determining a first PageUID zone associated with the first memory size by a second data structure, assigning a PageUID of the first PageUID zone to the first logical page, and modifying a third data structure to associate the first memory size with the first PageUID zone.

12. A method according to claim 11, further comprising:
detecting a second allocation of the first memory size in the object store for storage of a second logical page;
in response to detecting the second allocation, incrementing the first count of the first data structure indicating a number of times the first memory size was allocated for storage of a logical page, determining the first PageUID zone associated with the first memory size by the second data structure, and determining that all page PageUIDs of the first PageUID zone have been assigned; and in response to determining that all page PageUIDs of the first PageUID zone have been assigned, identifying a second PageUID zone including at least one unassigned PageUID, assigning a PageUID of the second PageUID zone to the second logical page, and modifying the third data structure to associate the first memory size with the second PageUID zone,
wherein the second PageUID zone is associated with a third memory size.

13. A method according to claim 8, further comprising:
in response to detection of the first allocation, determining a first PageUID partition associated with the first memory size, assigning a PageUID to the first logical page based on a first pointer associated with the first PageUID partition, and incrementing the first pointer.

14. A method according to claim 13, further comprising:
detecting a second allocation of a second memory size in the object store for storage of a second logical page; and
in response to detection of the second allocation, determining a second PageUID partition associated with the first memory size, assigning a PageUID to the second logical page based on a second pointer associated with the second PageUID partition, and decrementing the second pointer.

15. A non-transitory computer-readable medium storing program code executable by a processing unit of a computing system to:
detect a first allocation of a first memory size in an object store for storage of a first logical page;
in response to detection of the first allocation, increment a first count of a first data structure indicating a number of times the first memory size was allocated for storage of a logical page, the first data structure associating a respective count with each of a plurality of memory sizes, the respective count associated with a given memory size indicating a number of times the given memory size was allocated for storage of a logical page;
detect a first deallocation of the first logical page; and
in response to detection of the first deallocation, decrement a second count of the first data structure indicating a number of times a second one of the plurality of memory sizes was allocated for storage of a logical page; and
determine a memory usage associated with the object store based on the counts associated with each of the plurality of memory sizes by the first data structure,
wherein the second one of the plurality of memory sizes is different from the first memory size.

16. A medium according to claim 15, wherein decrementing the second count indicating the number of times the second one of the plurality of memory sizes was allocated for storage of a logical page comprises:
in response to detection of the first deallocation, determine that the second one of the plurality of memory sizes is the smallest of the plurality of memory sizes associated with a non-zero count by the first data structure; and
in response to the determination that the second one of the plurality of memory sizes is the smallest of the plurality of memory sizes associated with a non-zero count by the first data structure, decrement the second count indicating the number of times the second one of the plurality of memory sizes was allocated for storage of a logical page.

17. A medium according to claim 15, the program code executable by a processing unit of a computing system to:
in response to detection of the first allocation, determine a first PageUID zone associated with the first memory size by a second data structure, assign a PageUID of the first PageUID zone to the first logical page, and modify a third data structure to associate the first memory size with the first PageUID zone.

18. A medium according to claim 17, the program code executable by a processing unit of a computing system to:
detect a second allocation of the first memory size in the object store for storage of a second logical page;
in response to detection of the second allocation, increment the first count of the first data structure indicating a number of times the first memory size was allocated for storage of a logical page, determine the first PageUID zone associated with the first memory size by the second data structure, and determine that all page PageUIDs of the first PageUID zone have been assigned; and
in response to the determination that all page PageUIDs of the first PageUID zone have been assigned, identify a second PageUID zone including at least one unassigned PageUID, assign a PageUID of the second PageUID zone to the second logical page, and modify the third data structure to associate the first memory size with the second PageUID zone,
wherein the second PageUID zone is associated with a third memory size.

19. A medium according to claim 15, the program code executable by a processing unit of a computing system to:
in response to detection of the first allocation, determine a first PageUID partition associated with the first memory size, assign a PageUID to the first logical page based on a first pointer associated with the first PageUID partition, and increment the first pointer;
detect a second allocation of a second memory size in the object store for storage of a second logical page; and
in response to detection of the second allocation, determine a second PageUID partition associated with the first memory size, assign a PageUID to the second logical page based on a second pointer associated with the second PageUID partition, and decrement the second pointer.

* * * * *